(12) United States Patent
Sugihara et al.

(10) Patent No.: US 7,061,556 B2
(45) Date of Patent: Jun. 13, 2006

(54) DISPLAY DEVICE USING BIDIRECTIONAL TWO-TERMINAL ELEMENT AND MANUFACTURING METHOD OF DISPLAY DEVICE

(75) Inventors: Toshinori Sugihara, Miyagi (JP); Takeshi Hara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/497,638

(22) PCT Filed: Dec. 6, 2002

(86) PCT No.: PCT/JP02/12837

§ 371 (c)(1), (2), (4) Date: Jun. 4, 2004

(87) PCT Pub. No.: WO03/049068

PCT Pub. Date: Jun. 12, 2003

(65) Prior Publication Data

US 2005/0018098 A1 Jan. 27, 2005

(30) Foreign Application Priority Data

Dec. 7, 2001 (JP) .............................. 2001-374559

(51) Int. Cl.
*G02F 1/135* (2006.01)
(52) U.S. Cl. ...................................................... 349/49
(58) Field of Classification Search ................ 349/156, 349/157
See application file for complete search history.

(56) References Cited

U.S. PATENT DOCUMENTS

| | | | |
|---|---|---|---|
| 4,126,854 A | 11/1978 | Sheridon | |
| 5,042,917 A * | 8/1991 | Fujita et al. | 349/50 |
| 5,528,399 A | 6/1996 | Izumi et al. | |
| 5,545,291 A | 8/1996 | Smith et al. | |
| 5,715,026 A * | 2/1998 | Shannon | 349/49 |
| 5,719,647 A | 2/1998 | Fujikawa et al. | 349/40 |
| 5,926,236 A * | 7/1999 | den Boer et al. | 349/51 |
| 5,952,708 A | 9/1999 | Yamazaki | |

(Continued)

FOREIGN PATENT DOCUMENTS

CN 1160927 10/1997

(Continued)

OTHER PUBLICATIONS

L.T. Canham; "Silicon Quantum Wire Array Fabrication by electrochemical and Chemical Dissolution of Wafers"; Applied Physics Letters vol. 57(10) pp. 1046-1048; Sep. 1990.

(Continued)

*Primary Examiner*—Wilson Lee
*Assistant Examiner*—Angela M Lie
(74) *Attorney, Agent, or Firm*—Keating & Bennett, LLP

(57) ABSTRACT

To provide an active matrix type display device which can be manufactured by an easier method than before.

A display device 100 has a plurality of first electrodes 11, a plurality of bidirectional two-terminal elements 12, a plurality of picture electrodes 14 electrically connected to any one of the plurality of first electrodes 11 via at least one of the plurality of bidirectional two-terminal elements 12 respectively, a plurality of second electrodes 17, and a display medium layer provided between the plurality of picture electrodes 14 and the plurality of second electrodes 17. A layout relationship between each of the plurality of picture electrodes 14 and said at least one of the bidirectional two-terminal elements 12 is random.

18 Claims, 17 Drawing Sheets

U.S. PATENT DOCUMENTS

| | | | |
|---|---|---|---|
| 6,259,501 B1 | 7/2001 | Yaniv | 349/122 |
| 6,291,896 B1 | 9/2001 | Smith | 257/786 |
| 6,340,812 B1* | 1/2002 | Izumi et al. | 250/208.1 |
| 6,396,207 B1* | 5/2002 | Hasegawa et al. | 313/495 |
| 6,411,272 B1* | 6/2002 | Edwards | 345/87 |
| 6,535,264 B1 | 3/2003 | Imbabayashi et al. | 349/155 |
| 6,570,639 B1* | 5/2003 | Manabe et al. | 349/190 |
| 6,617,521 B1 | 9/2003 | Saito et al. | |
| 6,664,569 B1 | 12/2003 | Moon | 257/72 |
| 6,822,264 B1* | 11/2004 | Yamazaki et al. | 257/79 |
| 6,822,724 B1* | 11/2004 | Ogishima et al. | 349/181 |
| 6,844,673 B1* | 1/2005 | Bernkopf | 313/506 |
| 6,849,128 B1* | 2/2005 | Yonekura et al. | 118/621 |
| 6,861,121 B1* | 3/2005 | Matsunaga et al. | 428/141 |
| 2002/0153530 A1* | 10/2002 | Levine et al. | 257/107 |

FOREIGN PATENT DOCUMENTS

| | | |
|---|---|---|
| CN | 1259008 | 7/2000 |
| JP | 64-086116 | 3/1989 |
| JP | 11-243209 | 9/1999 |
| JP | 2001-305515 | 10/2001 |
| WO | WO 03/049068 A1 | 6/2003 |

OTHER PUBLICATIONS

Nobuyoshi Koshida et al.; Visible Electrolumiscence from Porous Silicon; Appl. Phys. Lett., vol. 60, No. 3, pp. 347-349; Jan. 1992.

Kiyoshi Shigehiro et al.; "Toner Display Using Insulative Particles Charged Triboelectrically"; Japan Hardcopy 2001; pp. 135-138.

* cited by examiner (a)

(b)

(c)

(d)

(e)

(a)

(b)

(a)

(b)

(c)

(d)

(a)

(b)

(c)

(d)

(e)

(f)

(a)

(b)

(c)

(d)

(e)

(f)

(g)

(h)

DISPLAY DEVICE USING BIDIRECTIONAL TWO-TERMINAL ELEMENT AND MANUFACTURING METHOD OF DISPLAY DEVICE

This application is a 371 of PCT/JP02/12837, Dec. 06, 2002

BACKGROUND OF THE INVENTION

1. Field of the Invention

The present invention relates to a display device, and in particular, to methods for producing a switching element used for the display device and for producing the display device.

2. Description of the Related Art

In recent years, significant progress has been made in the use of low-profile display devices such as a liquid crystal display and an organic EL (electro luminescence) display device. Of the low-profile display devices (FPD), an active matrix type display device capable of high-quality display in particular has three-terminal elements such as an amorphous silicon TFT (thin-film transistor), a polysilicon TFT and two-terminal elements such as an MIM (Metal-Insulator-Metal) used as switching elements thereon.

These switching elements are formed on a substrate constituting a display device in a process of manufacturing the display device. The switching elements are generally formed by repeating a film deposition process and a patterning process a plurality of times. For instance, in the case of a TFT, it is necessary to repeat the film deposition process and patterning process at least three times, and these processes are usually repeated four to eight times. In the case of the MIM, it is necessary to repeat them at least twice, and they are usually repeated three to four times.

The switching element is formed in each pixel. Because the area of the switching element is smaller than the area of the pixel, various thin films (a metallic layer, an insulating layer and a semiconductor layer for instance) which are deposited on almost the entire surface of the substrate are mostly removed in the patterning process. For instance, in the case of a transmissive liquid crystal display, approximately 90 percent of the metallic layer and semiconductor layer is removed in order to increase a pixel open area ratio.

The patterning process is mostly performed by a photolithographic process using photomasks, where it is necessary to align the photomasks with high precision in each process in order to suppress variations in element characteristics.

Furthermore, the substrates are becoming larger in size due to increasing size of display devices or for the sake of improving manufacturing efficiency, and so an apparatus for performing the film deposition process and patterning process is becoming larger in size.

As described above, the active matrix type FPD in the past has most of the materials for forming the switching element removed so that, as resources and energy are lost, costs thereof increase and a load to the environment also increases.

In addition, for the purposes of coping with the larger-size substrates, an expensive film deposition apparatus and a photolithographic apparatus for forming the switching element become larger in size. For that reason, manufacturing costs increase, and it becomes difficult to form the switching element having little variations in element characteristics over a large area.

The present invention has been implemented in consideration of the above points, and a primary object thereof is to provide an active matrix type display device which can be manufactured by an easier method than before and a manufacturing method of such a display device. Another object is to provide a manufacturing method of a bidirectional two-terminal element suitably used as a switching element of such a display device.

SUMMARY OF THE INVENTION

The display device according to the present invention is characterized by having a plurality of first electrodes, a plurality of bidirectional two-terminal elements, a plurality of picture electrodes electrically connected to one of the plurality of first electrodes via at least one of the plurality of bidirectional two-terminal elements respectively, a plurality of second electrodes, and a display medium layer provided between the plurality of picture electrodes and the plurality of second electrodes, where a layout relationship between each of the plurality of picture electrodes and said at least one of the bidirectional two-terminal elements is random and the objects are thereby attained.

It is desirable that the at least one of the bidirectional two-terminal elements has a pair of electrodes and a laminated semiconductor structure formed between the pair of electrodes.

It is desirable that each of the plurality of first electrodes and the at least one bidirectional two-terminal element are electrically connected via a conductive resin layer provided between one of the pair of electrodes of the at least one bidirectional two-terminal element and the first electrode.

The conductive resin layer may also include a conductive material and a photosensitive resin.

Each of the plurality of bidirectional two-terminal elements may be constituted to further have a light-shielding layer covering a side of the laminated semiconductor structure.

It is desirable that the width of the plurality of bidirectional two-terminal elements is smaller than a distance between adjacent ones of the plurality of picture electrodes.

It is desirable that the width of the plurality of bidirectional two-terminal elements is smaller than a distance between the adjacent ones of the plurality of first electrodes.

According to a preferable embodiment, the plurality of bidirectional two-terminal elements are selectively placed on the plurality of first electrodes. In this case, of the plurality of picture electrodes, area of a portion overlapping the plurality of first electrodes is half or less than half of the area of the entirety of the plurality of picture electrodes.

The method of manufacturing the display device according to the present invention is that of the display device having the plurality of first electrodes, a plurality of bidirectional two-terminal elements, a plurality of picture electrodes electrically connected to any one of the plurality of first electrodes via at least one of the plurality of bidirectional two-terminal elements respectively, a plurality of second electrodes, and a display medium layer provided between the plurality of picture electrodes and the plurality of second electrodes, which includes the following steps and the objects are thereby attained. (a) Preparing a substrate having a principal surface on which the plurality of first electrodes are formed, (b) preparing the plurality of bidirectional two-terminal elements, each of the plurality of bidirectional two-terminal elements having a pair of mutually opposed electrodes, (c) placing the plurality of bidirectional two-terminal elements randomly on the plurality of first electrodes at a predetermined density so that each of the plurality of bidirectional two-terminal elements is electrically connected to one of the plurality of first electrodes via one of the pair of electrodes, (d) forming the plurality of picture electrodes electrically connected to one of the plurality of first electrodes via at least one of the plurality of bidirectional two-terminal elements, respectively, and (e) providing the plurality of second electrodes and the display medium layer to be mutually opposed between the plurality of picture electrodes and the plurality of second electrodes via the display medium layer.

The step (c) preferably includes the steps of (c-1) dispersing the plurality of bidirectional two-terminal elements in a predetermined density in a coating material including a conductive material and a resin material; (c-2) providing the coating material including the plurality of bidirectional two-terminal elements on the plurality of first electrodes of the substrate; and (c-3) selectively leaving the coating material existing between the plurality of first electrodes of the substrate and the plurality of bidirectional two-terminal elements.

The resin material may include a positive-type photosensitive resin, and the step of selectively leaving the coating material may include a step of irradiating light from the principal surface side of the substrate.

The step (d) preferably includes the steps of: providing an insulating material to cover the plurality of bidirectional two-terminal elements placed on the plurality of first electrodes; selectively eliminating the insulating material on the plurality of bidirectional two-terminal elements and thereby exposing the other electrode of each of the plurality of bidirectional two-terminal elements; and forming the plurality of picture electrodes, each of them electrically connected to the other electrode which is exposed.

The insulating material may include a negative-type photosensitive resin, and the step of exposing the other electrode may include a step of irradiating light from a backside of the substrate.

Each of the plurality of bidirectional two-terminal elements has the laminated semiconductor structure between the pair of electrodes, and the side of the laminated semiconductor structure may be covered by the light-shielding layer.

The step (c-2) may also be performed by providing the coating material on the plurality of first electrodes by an inkjet method.

In the step (a), the plurality of first electrodes may also be the ones formed on the principal surface of the substrate by the inkjet method.

The method of manufacturing the display device according to the present invention is that of the display device having a plurality of first electrodes, a plurality of bidirectional two-terminal elements, a plurality of picture electrodes electrically connected to one of the plurality of first electrodes via at least one of the plurality of bidirectional two-terminal elements respectively, a plurality of second electrodes, and a display medium layer provided between the plurality of picture electrodes and the plurality of second electrodes, which includes the following steps and the objects are thereby attained. (a) Preparing the substrate having the principal surface, (b) preparing the plurality of bidirectional two-terminal elements having a pair of mutually opposed electrodes respectively, (c) providing on the principal surface of the substrate a solution including conductive particles for forming the first electrodes and the plurality of bidirectional two-terminal elements to form the plurality of first electrodes on the principal surface, and placing the plurality of bidirectional two-terminal elements randomly on the plurality of first electrodes so that each thereof will be electrically connected to one of the plurality of first electrodes via one of the pair of electrodes, (d) forming the plurality of picture electrodes electrically connected to one of the plurality of first electrodes via at least one of the plurality of bidirectional two-terminal elements respectively, and (e) providing the plurality of second electrodes and the display medium layer to be mutually opposed via the display medium layer between the plurality of picture electrodes and the plurality of second electrodes.

It is desirable that the step (c) includes a step of providing the solution on the principal surface of the substrate by the inkjet method.

The solution may further include a binder, and the step (c) may further include a step of baking the binder included in the provided solution.

The method of manufacturing the bidirectional two-terminal element according to the present invention is characterized by, to attain the objects, including the steps of preparing the substrate having an insulating layer and a semiconductor layer on the insulating layer, forming a bidirectional laminated semiconductor structure in a predetermined form including the semiconductor layer on the insulating layer, forming a first electrode layer on the bidirectional laminated semiconductor structure, adhering the first electrode layer to another substrate, removing the insulating layer in a state of having the first electrode layer adhered thereto and thereby separating the bidirectional laminated semiconductor structure from the substrate, and forming a second electrode layer on the semiconductor layer of the bidirectional laminated semiconductor structure.

DETAILED DESCRIPTION OF PREFERRED EMBODIMENTS

[Display Device]

First, display devices 100 and 101 according to an embodiment of the present invention and a manufacturing method thereof will be described.

Figure 1:
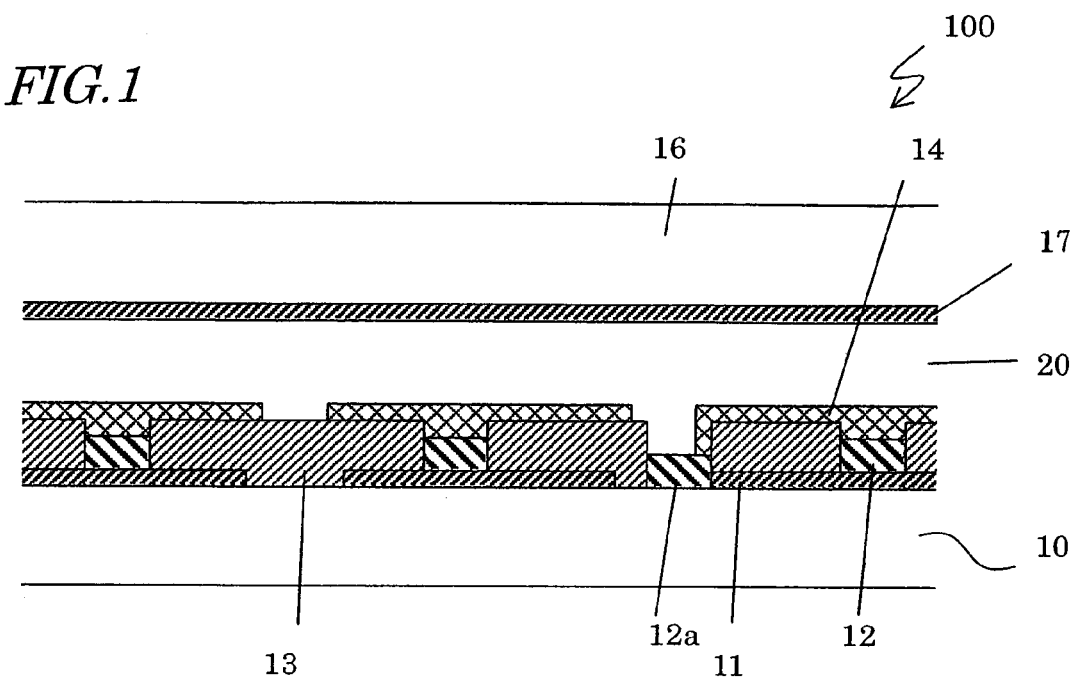
FIG. 1 is a schematic sectional view of a display device 100 according to an embodiment of the present invention.
Figure 2:
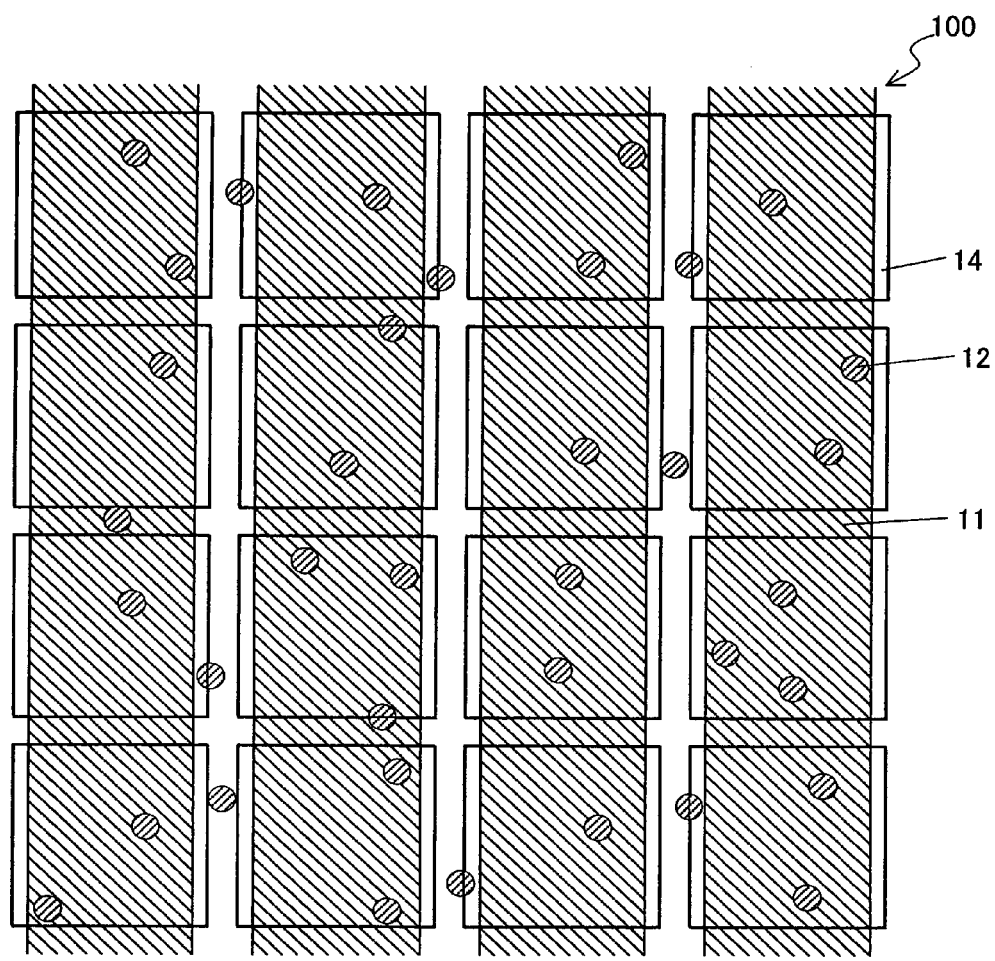
FIG. 2 is a schematic top view of the display device 100 according to the embodiment of the present invention.

FIG. 1 shows a schematic sectional view of a display device 100 according to the embodiment of the present invention, and FIG. 2 shows a top view thereof.

The display device 100 has a first substrate 10 having a plurality of first electrodes 11, a plurality of bidirectional two-terminal elements, and a plurality of picture electrodes 14 respectively disposed on its principal surface, a second substrate 16 having a plurality of second electrodes 17 disposed on its principal surface, and a display medium layer 20 provided between the picture electrodes 14 and a plurality of second electrodes 17. The plurality of picture electrodes 14 are electrically connected to one of the plurality of first electrodes 11 via at least one of a plurality of bidirectional two-terminal elements 12 respectively. As shown in FIG. 2, a layout relationship between the picture electrodes 14 and bidirectional two-terminal elements 12 is random. There are cases where a plurality of the bidirectional two-terminal elements 12 exist between one picture electrode 14 and one first electrode 11. There may also be provided a bidirectional two-terminal element 12 which does not contribute to an electrical connection between the picture electrode 14 and first electrode 11 (for example, the bidirectional two-terminal elements 12a second from the right in FIG. 1).

The bidirectional two-terminal element 12 is desirably a thyristor having a pair of electrodes 26, 27 and a laminated semiconductor structure 12A disposed between the pair of electrodes 26, 27, for instance, as described later by referring to FIGS. 12(a) and (b) and FIGS. 13(a) to (e). From a viewpoint of operational stability of the bidirectional two-terminal element 12, it is desirable to have the sides of the laminated semiconductor structure 12A covered by a light shielding layer 28 except for the cases of addressing by using the light.

The display device 100 has the bidirectional two-terminal element (a bidirectional thyristor for instance) 12 turned on and off according to a voltage applied to the first electrodes 11, and a predetermined voltage is thereby applied (or current is supplied) to the display medium layer 20 between the picture electrodes 14 and second electrodes 17 so as to perform display. As for the display medium layer 20, various types of display medium layers such as a liquid crystal layer and an organic EL layer may be used. A specific configuration of the display device according to the types of display medium will be described later.

Next, the manufacturing method of the display device 100 will be described by referring to FIGS. 3(a) to (e). Here, the bidirectional two-terminal elements 12 shown in FIG. 12(a) or (b) will be used. The configuration and manufacturing method of the bidirectional two-terminal elements 12 will be described later.

First, as shown in FIG. 3(a), the first electrodes 11 are formed on the surface of the first substrate 10 having an insulating surface. It is desirable that the first electrodes 11 have certain area to be able to make secure connections with the bidirectional two-terminal elements 12 which are randomly placed. It needs to be at least larger than the area of the surface on which the electrodes of the bidirectional two-terminal elements 12 are formed (hereafter, referred to as "size" of the bidirectional two-terminal elements 12), and preferably set at a comparable width to that of the picture electrodes 14. To simplify a manufacturing process, it is desirable to provide a space between mutually adjacent picture electrodes 14 that is larger than a maximum width of the bidirectional two-terminal elements 12 and provide a space between mutually adjacent first electrodes 11 that is larger than the maximum width of the bidirectional two-terminal elements 12.

Next, as shown in FIG. 3(b), the bidirectional two-terminal elements 12 are randomly placed on the principal surface of the first substrate 10. In this case, as shown in FIG. 2, the bidirectional two-terminal elements 12 are placed so that each individual picture electrode 14 is electrically connected to a corresponding first electrode 11 by at least one bidirectional two-terminal element 12. The bidirectional two-terminal elements 12 are randomly placed on the principal surface of the first substrate 10 with an area density (number of the elements 12 per unit area) such that three bidirectional two-terminal elements 12 are placed against one picture electrode 14 on average.

The bidirectional two-terminal elements 12 must be placed so that one of the electrodes of the bidirectional two-terminal element 12 (electrode 26 or 27 in FIG. 12) is electrically connected to the first electrode 11. To place the bidirectional two-terminal elements 12 stably on the principal surface of the first substrate 10, it is desirable to use cylindrical bidirectional two-terminal elements 12. If the cylindrical bidirectional two-terminal elements 12 having the electrodes formed on the bottom and top surfaces are used, they are stably placed on the principal surface only on the bottom and top surfaces so that the electrical connections are reliably achieved.

A description will be given of a specific process of randomly placing the bidirectional two-terminal elements 12 on the principal surface of the first substrate 10 having the first electrode 11 formed thereon, for instance, by referring to FIGS. 3(b) and (c).

First, the bidirectional two-terminal elements 12 are dispersed in a predetermined density in a coating material including a conductive material and a resin material. For instance, the coating material wherein powdered ITO is dispersed in the resin material, preferably the resin material having photosensitivity, is prepared. It is possible to further mix a solvent in order to adjust viscosity and film thickness. As for the coating material, it is sufficient to show the conductivity capable of electrically connecting the bidirectional two-terminal element 12 to the first electrode 11 in a definitive state. A coating material 52 including the bidirectional two-terminal elements 12 is provided on the principal surface of the first substrate 10 (FIG. 3(*b*)). As for the method of providing the coating material, known coating methods and printing methods may be widely applied.

Figure 3:
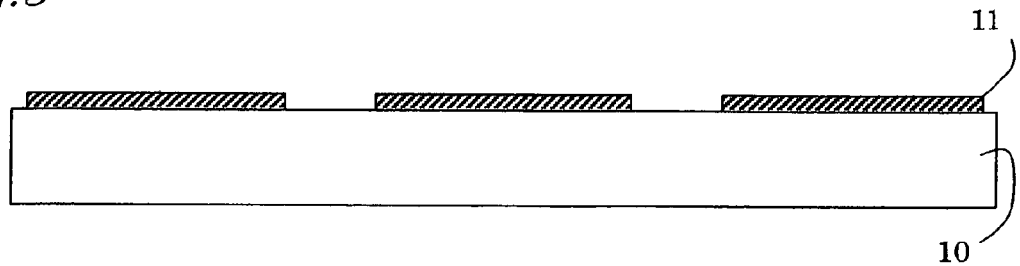
FIGS. 3(a) to (e) are schematic sectional views for explaining a manufacturing method of the display device 100 according to the embodiment of the present invention.
Figure 3:
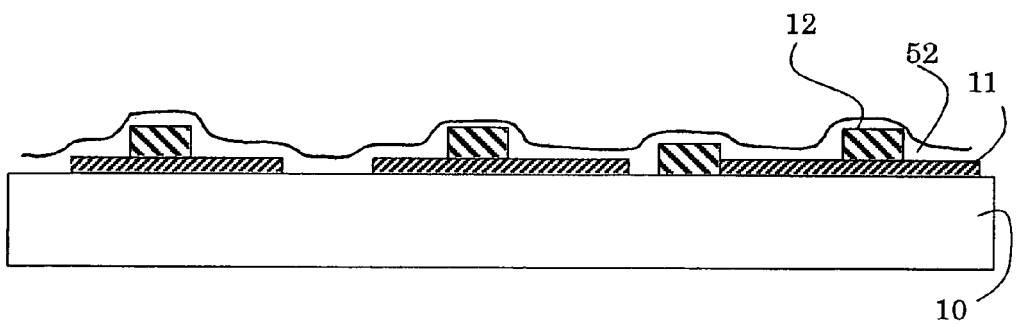
Figure 3:
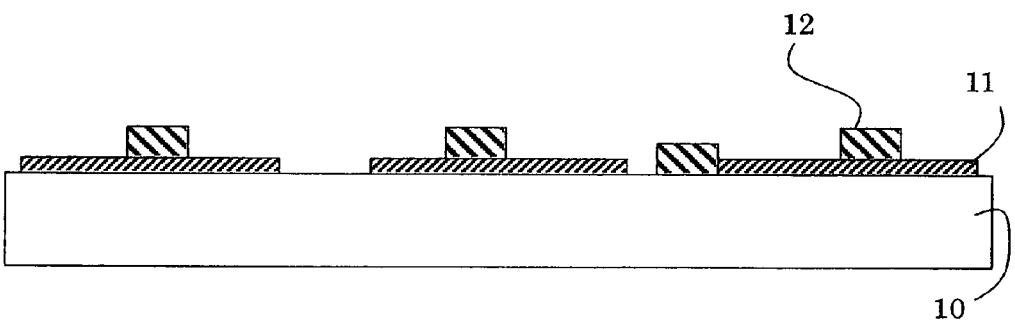
Figure 3:
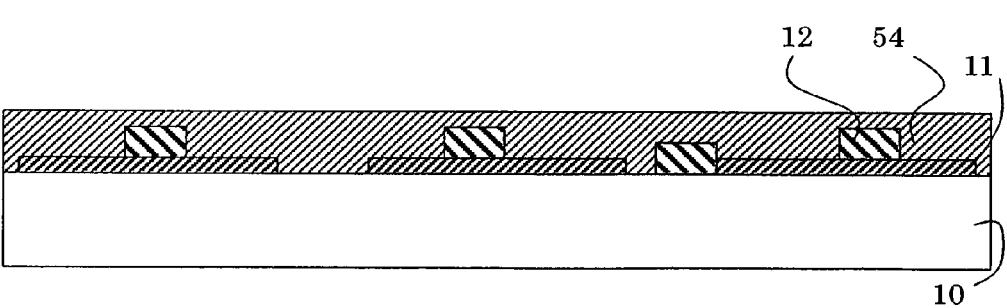
Figure 3:
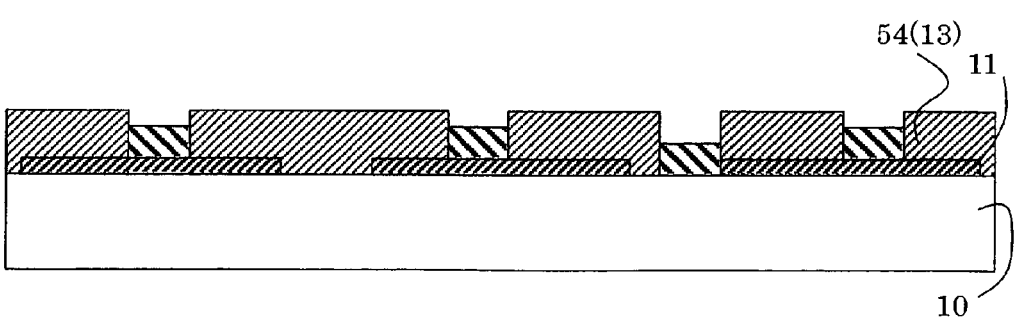

Next, the coating material existing between the bidirectional two-terminal elements 12 and the principal surface of the first substrate 10 is selectively left. As shown in FIG. 3(*c*), the bidirectional two-terminal elements 12 are fixed on the principal surface of the first substrate 10 by performing this step.

For instance, in the case where the resin material included in the coating material 52 is a positive-type photosensitive resin, if the light for decomposing the photosensitive resin is irradiated from the upside in a state shown FIG. 3(*b*), the photosensitive resin in the lower portion of the bidirectional two-terminal elements 12 is not irradiated and so it is not decomposed. As shown in FIG. 3(*c*), only the photosensitive resin in the lower portion of the bidirectional two-terminal elements 12 is left by undergoing a subsequent development step so that the bidirectional two-terminal elements 12 are thereby fixed.

In the case where the first substrate 10 passes the light, it is also possible, by using a photomask for light-shielding at least a part of the first electrodes 11 and irradiating the light from the backside of the first substrate 10 after the light irradiation step, to decompose the photosensitive resin in the lower portion of the bidirectional two-terminal elements 12 existing in the spacing of the first electrodes 11 or astride the adjacent first electrodes so as to eliminate unnecessary bidirectional two-terminal elements 12. It is possible, as a matter of course, to omit the photomask in the case where the first electrodes 11 are light-shielding.

Thereafter, as shown in FIG. 3(*d*), an insulating material 54 is arranged to cover the bidirectional two-terminal elements 12 placed on the first electrodes 11. An interlayer insulation film (reference numeral 13 in FIG. 1) formed by the insulating material 54 is thicker than the height of the bidirectional two-terminal elements 12. To provide the insulating material 54, known coating methods and printing methods may be widely applied. The insulating material 54 preferably include the photosensitive resin.

Subsequently, the insulating material 54 on the bidirectional two-terminal elements 12 is selectively eliminated so as to expose the other electrodes of the bidirectional two-terminal elements 12. In the case of using a negative-type photosensitive resin as the insulating material 54, if the light is irradiated from the underside surface (the surface opposed to the principal surface), the photosensitive resin positioned on the bidirectional two-terminal elements 12 is not irradiated. Therefore, by undergoing the subsequent development step, the other electrodes in the upper part of the bidirectional two-terminal elements 12 are exposed. To be more specific, an insulating layer 13 of the display device 100 shown in FIG. 1 is formed.

It is also possible to use the positive-type photosensitive resin as the insulating material 54. In this case, the process undergoes the following steps.

First, the device is coated with the positive-type photosensitive resin, and the positive-type photosensitive resin is exposed from the principal surface side of the first substrate 10. As the electrodes (typically, metal electrodes) are formed on the top surfaces of the bidirectional two-terminal elements 12, light exposure of the positive-type photosensitive resin on the bidirectional two-terminal elements 12 is increased by reflected light from the electrodes, so that there arises a difference in the light exposure between it and the portions other than the bidirectional two-terminal elements 12. It is possible, by utilizing this difference in the light exposure, to selectively eliminate the positive-type photosensitive resin on the bidirectional two-terminal elements 12.

In the case of using a material having no photosensitivity for the insulating material 54, it is possible to form a photosensitive resin layer having openings on the bidirectional two-terminal elements 12 by, after providing the insulating material 54 on the principal surface side of the first substrate 10, coating it with the negative-type or positive-type photosensitive resin and performing the exposure and development by the same method as described above. It is possible, by etching the insulating material 54 by using this photosensitive resin layer having the openings defining an etching mask, to form the interlayer insulating layer 13 of the same structure as described above.

In the step of selectively eliminating the insulating material 54 on the bidirectional two-terminal elements 12 in the process of forming the interlayer insulating layer 13, it is desirable to simultaneously eliminate the insulating material 54 on terminal portions (not shown) of the first electrodes 11. The terminal portions of the first electrodes 11 are provided outside a display area, and are connected to a circuit for supplying a data signal, for instance, to the first electrodes 11.

In the case of using the negative-type photosensitive resin as the insulating material 54 or in the case of combinedly using the insulating material 54 having no photosensitivity and the negative-type photosensitive resin, masks for light-shielding the terminal portions of the first electrodes 11 when exposing the negative-type photosensitive resin from the underside surface of the first substrate 10 are placed in order to expose the terminal portions of the first electrodes 11. In the case of using the positive-type photosensitive resin as the insulating material 54 or in the case of combinedly using the insulating material 54 having no photosensitivity and the positive-type photosensitive resin, the masks for exposing only the terminal portions of the first electrodes 11 are used. In any of these cases, precision in mask alignment is very loose so that the precision of 0.1 mm or so is sufficient.

In the case of using the negative-type photosensitive resin, the first substrate 10 and first electrodes 11 are translucent. In the case of using the positive-type photosensitive resin, however, these components do not need to be translucent.

Thereafter, the conductive material (ITO, for instance) is deposited and patterned to cover almost the entire surface of the first substrate 10 so as to form a plurality of the picture electrodes 14 electrically connected to the other exposed electrodes respectively. This step may be performed by known film deposition processes and patterning processes (photolithographic process, for instance).

Next, for instance, the second substrate 16 having the second electrodes 17 formed thereon is prepared, and the first substrate 10 and second substrate 16 are stuck together so that the first electrodes 11 and second electrodes will be mutually opposed via the display medium layer 20 between the picture electrodes 14 and the second electrodes 17. The display medium layer 20 may be formed either before or after the first substrate 10 and second substrate 16 are stuck together. Thus, the display device 100 is obtained.

In the case where the display medium layer 20 is comprised of a solid matter (a light emitting layer of an organic EL display device, for instance), it is feasible to sequentially form the display medium layer 20 and second electrodes on the first substrate 10 obtained as described above. Furthermore, it is also feasible to place a protective layer and an opposed substrate as required. The method of forming the display medium layer 20 and the second electrodes 17 may be changed as appropriate according to the material used for the display device 100.

Figure 17:
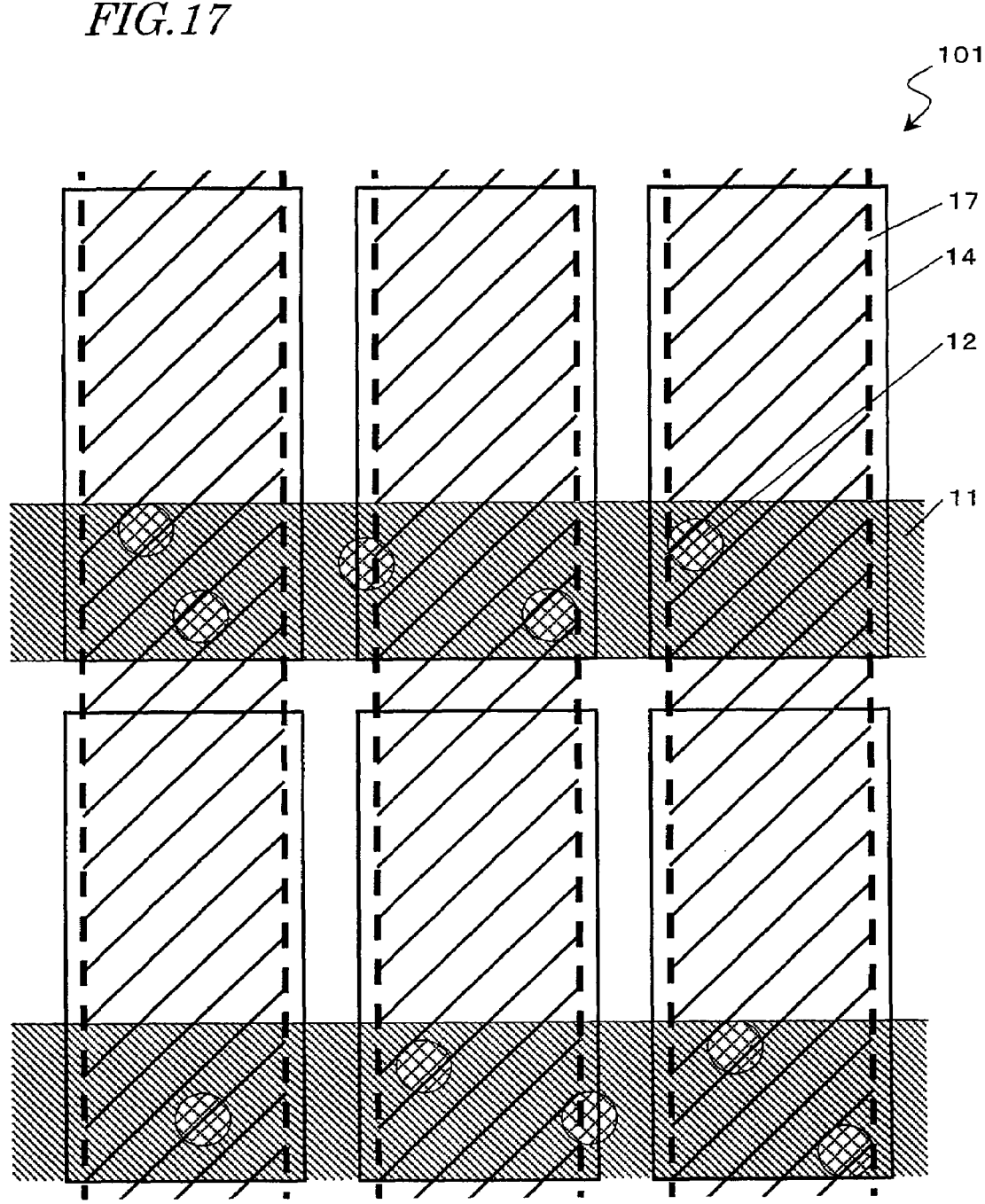
FIG. 17 is a schematic top view of a display device 101 according to the embodiment of the present invention.
Figure 18:
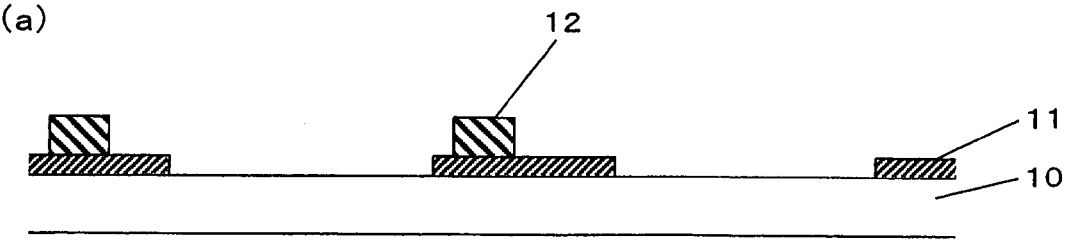
FIGS. 18(a) to (d) are schematic sectional views for describing a manufacturing method of the display device 101 according to the embodiment of the present invention.
Figure 18:
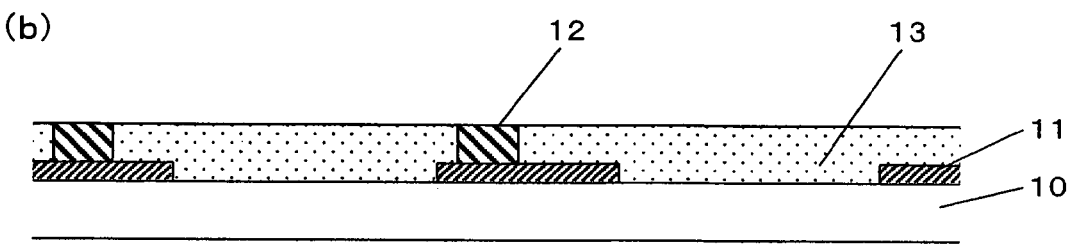
Figure 18:
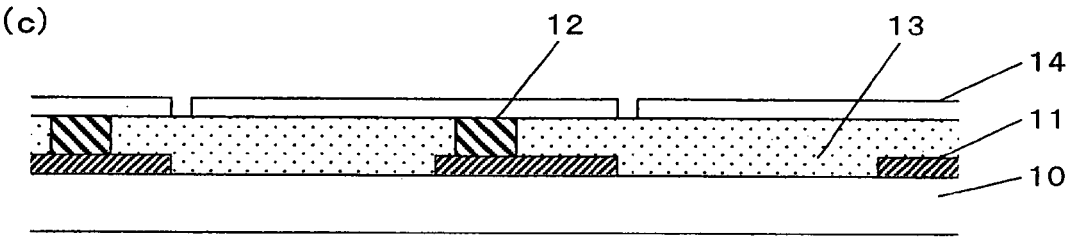
Figure 18:
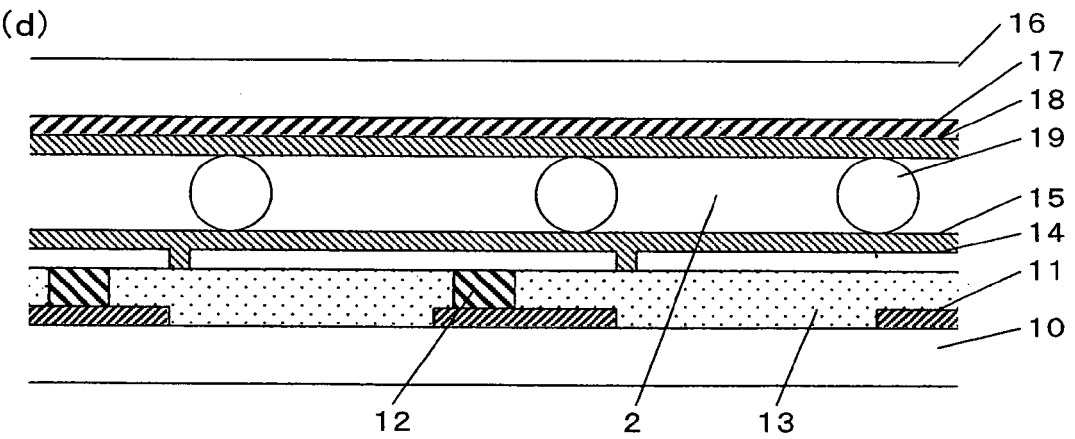

Next, the display device 101 according to the embodiment of the present invention will be described. FIGS. 17 and 18(*d*) show a top view and a schematic sectional view of the display device 101 respectively.

The display device 101 has the same basic configuration as the display device 100. However, the display device 101 is different in that the bidirectional two-terminal elements 12 are selectively placed on the first electrodes 11 as shown in FIG. 17. To be more specific, the bidirectional two-terminal elements 12 do not exist in any region other than the region on the first electrodes 11. Therefore, all the bidirectional two-terminal elements 12 contribute to electrical connections between the picture electrodes 14 and the first electrodes 11, and so it is possible to reduce the number of the bidirectional two-terminal elements to be used for manufacturing of the display device.

As for the configuration of the display device 101, the bidirectional two-terminal elements 12 are placed to be securely connected to the first electrodes 11. Therefore, it is not necessary to set the area of the first electrodes 11 large, as in the case of the display device 100, in order to improve certainty of the connections between the first electrodes 11 and the bidirectional two-terminal elements 12. Typically, the area of the picture electrodes 14 overlapping the first electrodes 11 is half or less than half of the area of the entirety of the picture electrodes 14. It is possible to render the portions of the picture electrodes 14 overlapping the first electrodes 11 smaller as described above so as to reduce parasitic capacitance between the first electrodes 11 and the picture electrodes 14. Consequently, it becomes possible to prevent reduction in visual quality such as shadowing.

Next, the manufacturing method of the display device 101 will be described by referring to FIGS. 18(*a*) to (*d*) and FIGS. 20(*a*) to (*f*).

First, there is a prepared solution in which conductive particles and the plurality of bidirectional two-terminal elements 12 are dispersed in a solvent (hereafter, referred to as "coating solution"). As for the conductive particles, it is possible to use metallic particles created by using Al, Cu, Ag, Ni, Pd, W and so on and metallic oxide particles created by using ITO and so on singly or in combination of two or more kinds. It is also possible to use the particles in which a film made of a metal or a metallic oxide used for the conductive particles is formed on the surface of insulating particles. The conductive particles preferably have a particle diameter of 10 nm to 100 nm, which is typically 30 nm or so. The conductive particles of the coating solution have a density of 5 to 50 percent by mass for instance. It is possible, as necessary, to mix the binder with the coating solution. For instance, it is desirable to mix the binder in the case where film formability of the conductive particles alone is insufficient to form the electrodes. Materials in the public domain such as various resin materials, for instance, may be used as the binder. As for the bidirectional two-terminal elements 12, the bidirectional two-terminal elements shown in FIGS. 12(*a*) or (*b*) are used for instance. As for the solvent of the coating solution, it is possible to use water, IPA, n-methyl-pyrrolidone, n-octanol, iso-butanol, ethylene-glycol, toluene and so on.

As shown in FIG. 18(*a*), the first electrodes 11 and the bidirectional two-terminal elements 12 are integrally formed on the principal surface of a substrate 10 by providing the coating solution to the substrate 10. Every bidirectional two-terminal element 12 which is formed is randomly placed on one of the first electrodes 11, and is electrically connected to the first electrode 11. The methods of providing the coating solution broadly include coating methods and printing methods in the public domain, but the inkjet method is preferable. It is possible, by using the inkjet method, to provide the coating solution only to a desired region of the substrate 10 so as to improve usability of the material. There is also an advantage, when providing the coating solution by the inkjet method, that it is no longer necessary to perform a patterning process thereafter.

After providing the coating solution, the solvent included therein is eliminated. It is possible, as for the method of eliminating the solvent, to use elimination methods by pressure reduction and heating in the public domain without being limited in particular. In the case where the coating solution includes the binder, it is also possible to bake the binder as necessary.

Figure 20:
FIGS. 20(a) to (f) are schematic sectional views for describing the manufacturing method of the display device 101 according to the embodiment of the present invention.
Figure 20:
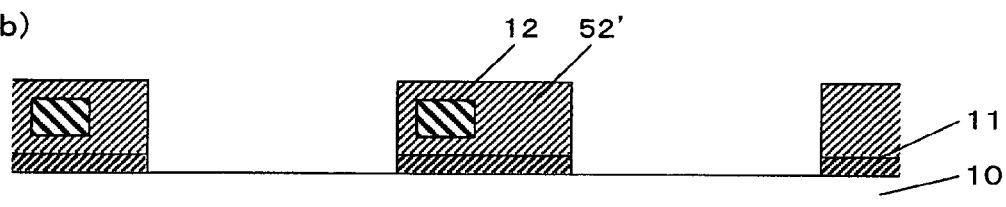
Figure 20:
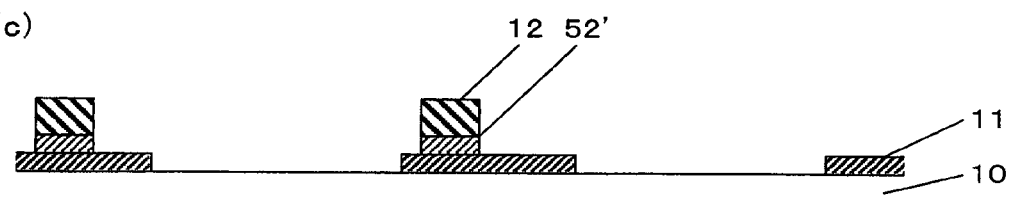
Figure 20:
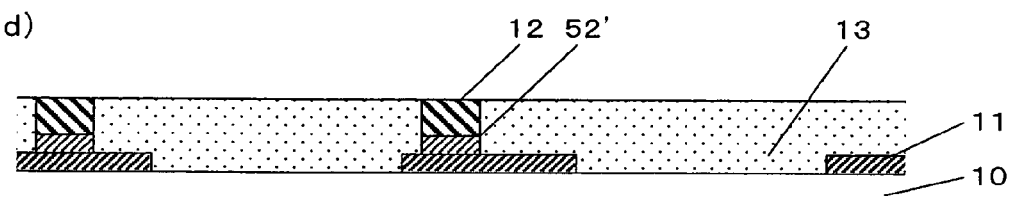
Figure 20:
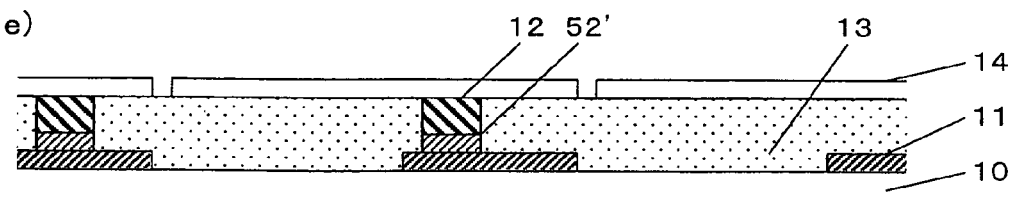
Figure 20:
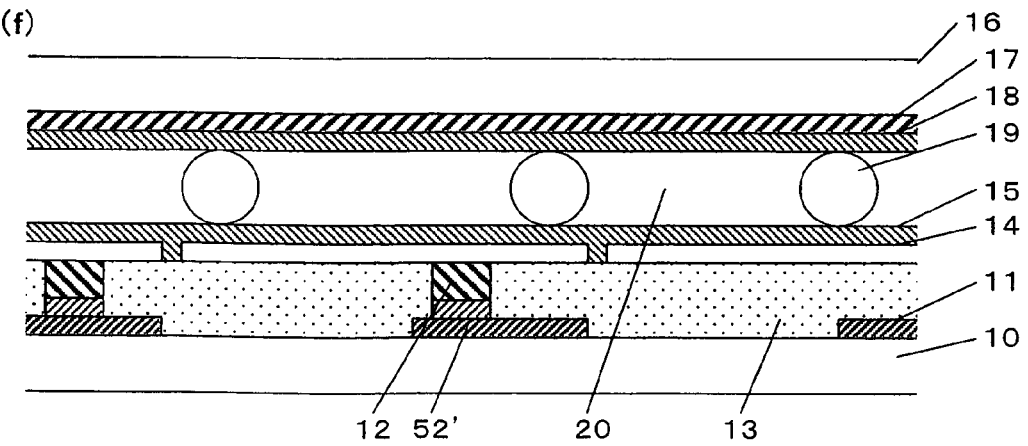

As shown in FIGS. 20(*a*) and (*b*), it is also possible to sequentially form the first electrodes 11 and the bidirectional two-terminal elements 12 instead of the process of integrally forming the first electrodes 11 and the bidirectional two-terminal elements 12.

In the case of sequentially forming the first electrodes 11 and the bidirectional two-terminal elements 12, the first electrodes 11 are formed first on the principal surface of the substrate 10 as shown in FIG. 20(*a*). For instance, the solution in which the conductive particles are dispersed in the solvent (hereafter, referred to as "conductive coating solution") is provided on the principal surface of the glass substrate 10 by the inkjet method. The method of providing the conductive coating solution is not limited in particular, but the method in the public domain may be applied. It is advantageous to use the inkjet method because the patterning process becomes unnecessary. Next, the solvent included in the conductive coating solution is eliminated. In the case where the conductive coating solution includes the binder (resin material for instance), the binder is baked as necessary after providing the conductive coating solution. Thus, the first electrodes 11 are formed. As for the conductive particles to be used for the conductive coating solution, it is possible to use the metallic particles of Al, Cu, Ag, Ni, Pd, W and so on and the metallic oxide particles of ITO and so on singly or in combination of two or more kinds. The conductive particles preferably have the particle diameter of 10 nm to 100 nm, which is typically 30 nm or so. The solvent used for the conductive coating solution may be water, IPA, n-methyl-pyrrolidone, n-octanol, iso-butanol, ethylene-glycol, toluene and so on for instance. It is also possible, by using metallic materials such as Al, Mo and Ta, to form a metallic film of about 300 nm thickness for instance on the principal surface of the glass substrate 10 by a sputtering method and then pattern the metallic film by a photo-etching method so as to form the first electrodes 11.

Thereafter, as shown in FIG. 20(b), the inkjet method is used to provide a coating material 52' including the bidirectional two-terminal elements 12 only on the first electrodes 11. As for the coating material 52', it is possible to use the coating material like the coating material 52 described by referring to FIG. 3(b). It is desirable to set viscosity of the coating material 52' at 8 cp to 20 cp by adjusting the kinds and amounts of the solvent and binder. The density of the bidirectional two-terminal elements 12 of the coating material 52' may be about the same as that of the bidirectional two-terminal elements 12 of the coating material 52, which is preferably 5 to 50 percent by mass.

Next, the coating material 52 existing between the bidirectional two-terminal elements 12 and the first electrodes 11 is selectively left by the same method as described by referring to FIG. 3(b). Thus, the bidirectional two-terminal elements 12 are fixed on the first electrodes 11.

After integrally forming (FIG. 18(a)) or sequentially forming (FIGS. 20(a) and (b)) the first electrodes 11 and the bidirectional two-terminal elements 12 on the principal surface of the substrate 10 in the above process, an interlayer insulation film 13 is formed. The material of the interlayer insulation film 13 may be the same as an insulating material 54 described by referring to FIG. 3(d). The interlayer insulation film 13 may be formed by providing the insulating material 54 on the principal surface of the substrate 10 by the method in the public domain. The thickness of interlayer insulation film 13 is set to cover the first electrodes 11 and expose the electrodes on the top surfaces of the bidirectional two-terminal elements 12. It is also feasible to perform etching to expose the electrodes on the top surfaces of the bidirectional two-terminal elements 12 after providing the insulating material 54 to be thicker than height of the bidirectional two-terminal elements 12.

Thereafter, substantially the same process as that described about the display device 100 is performed so as to obtain the display device 101.

As it is possible to manufacture the display devices 100 and 101 according to the embodiments of the present invention as described above, there is no need to make the bidirectional two-terminal elements 12 in the manufacturing process of the display devices 100 and 101, so that the bidirectional two-terminal elements 12 separately made may be used. To be more specific, the bidirectional two-terminal elements 12 can be independently made without being influenced by the size of the display device and the size or placement of the pixels. Therefore, the bidirectional two-terminal elements 12 can be made at a high density so that the bidirectional two-terminal elements 12 wasting no material and energy and having no variations in characteristics can be made.

According to the processes illustrated as the manufacturing method of the display device 100 and the display device 101, it is possible to form a desired structure in a self-aligning manner by exposing the coating material 52 and the insulating material 54 while using as the photomasks the bidirectional two-terminal elements 12 randomly placed on the principal surface of the substrate 10 or on the first electrodes 11. Or else, it becomes no longer necessary to separately perform the process of placing the bidirectional two-terminal elements 12 and the process of fixing the bidirectional two-terminal elements 12 such as exposure by integrally forming the first electrodes 11 and the bidirectional two-terminal elements 12 on the principal surface of the substrate 10. For that reason, neither an expensive photolithographic apparatus nor photomask alignment is necessary.

Therefore, according to the manufacturing method of the display devices 100 and 101, it is possible to manufacture an active matrix type display device more inexpensively and simply than before.

Figure 19:
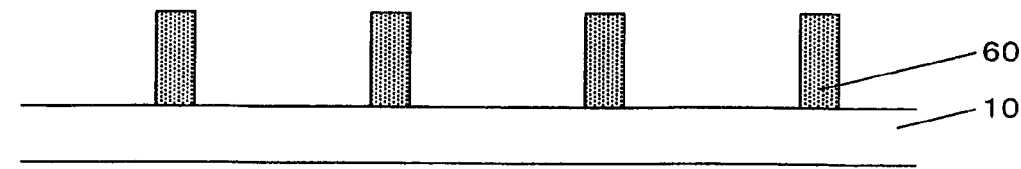
FIGS. 19(a) to (f) are schematic sectional views for describing the manufacturing method of the display device 101 according to the embodiment of the present invention.
Figure 19:
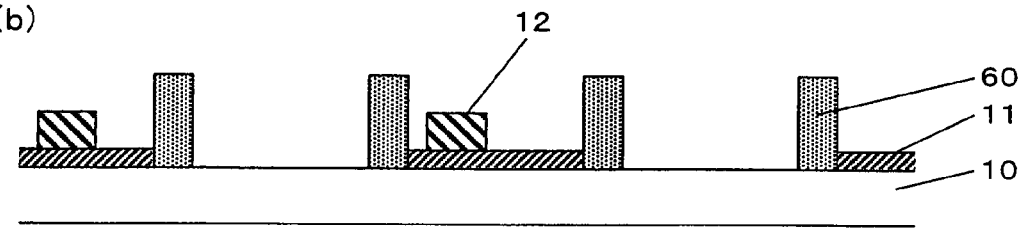
Figure 19:
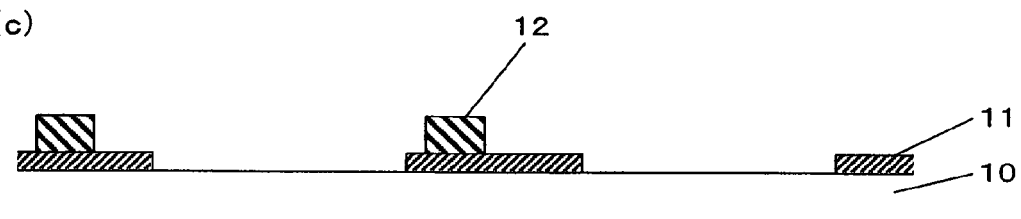
Figure 19:
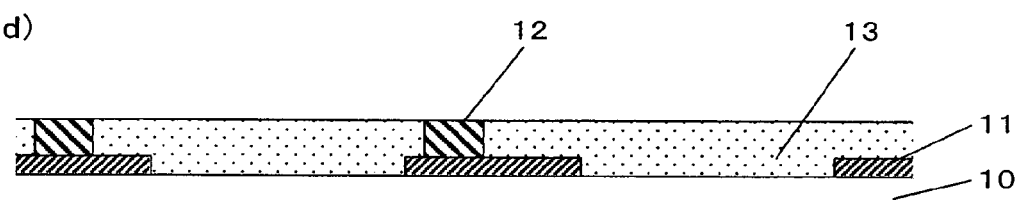
Figure 19:
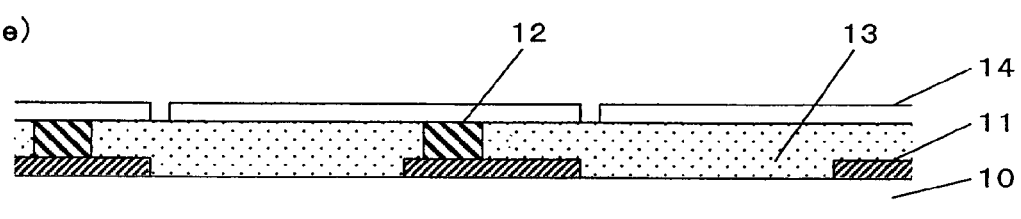
Figure 19:
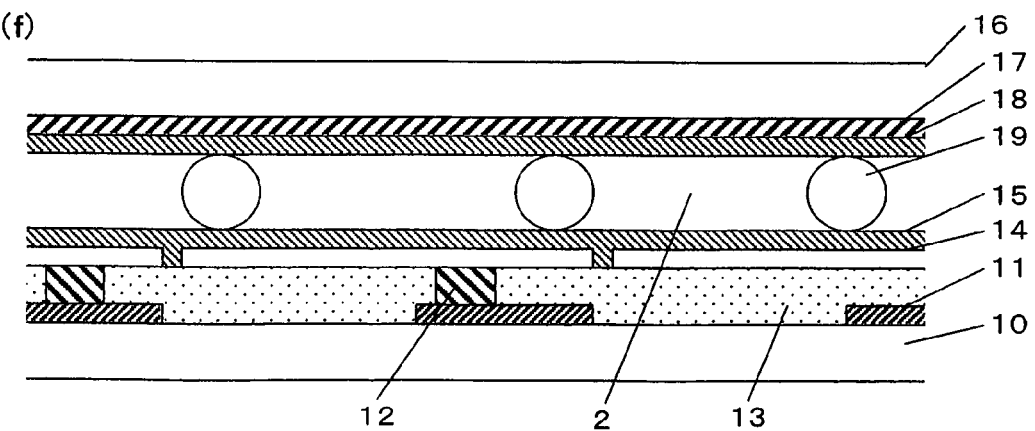
Figure 21:
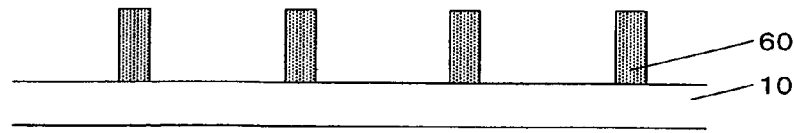
FIGS. 21(a) to (h) are schematic sectional views for describing the manufacturing method of the display device 101 according to the embodiment of the present invention.
Figure 21:
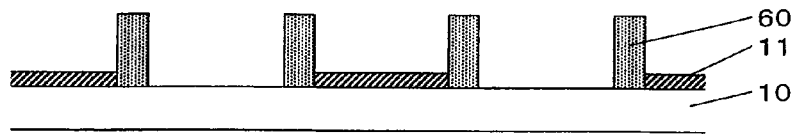
Figure 21:
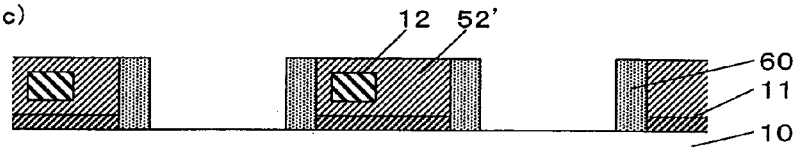
Figure 21:
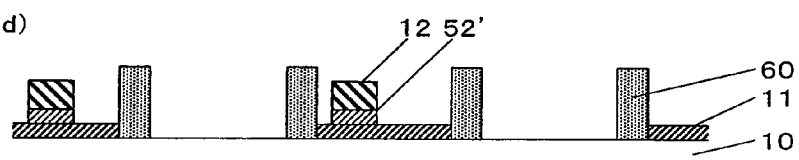
Figure 21:
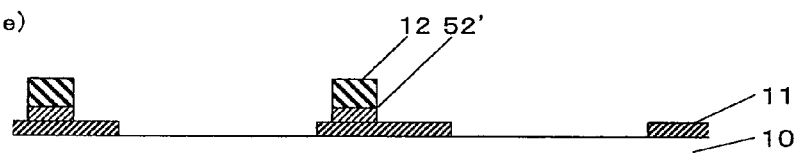
Figure 21:
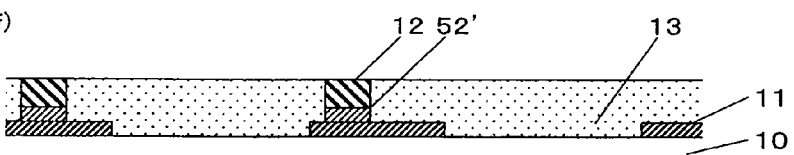
Figure 21:
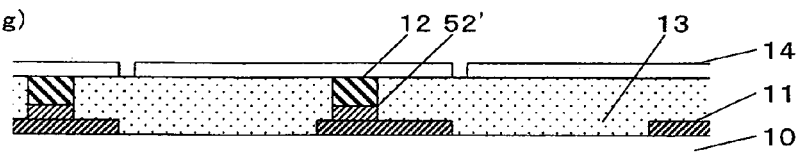
Figure 21:
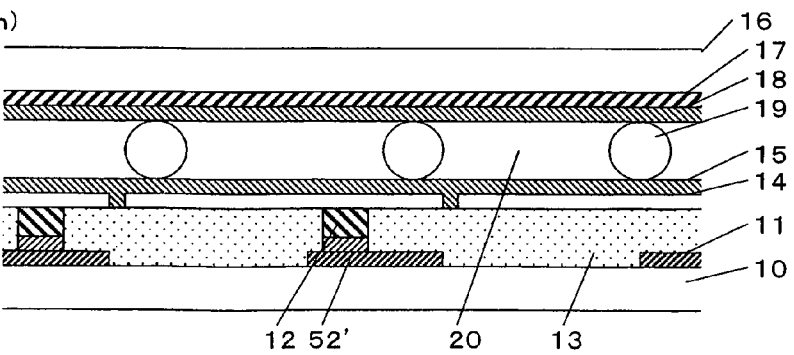

Hereafter, a description will be given by referring to FIGS. 4 to 16 and FIGS. 19 and 21 as to further specific configurations and manufacturing methods of the display device according to the embodiment of the present invention. For simplification purposes, the components having substantially the same functions are indicated by the same reference numerals, and a description thereof will be omitted hereinafter. The top views of the various display devices shown in FIGS. 4 to 11 are substantially the same as FIG. 2. And the top views of the display device shown in FIGS. 19 and 21 are substantially the same as FIG. 17.

Figure 4:
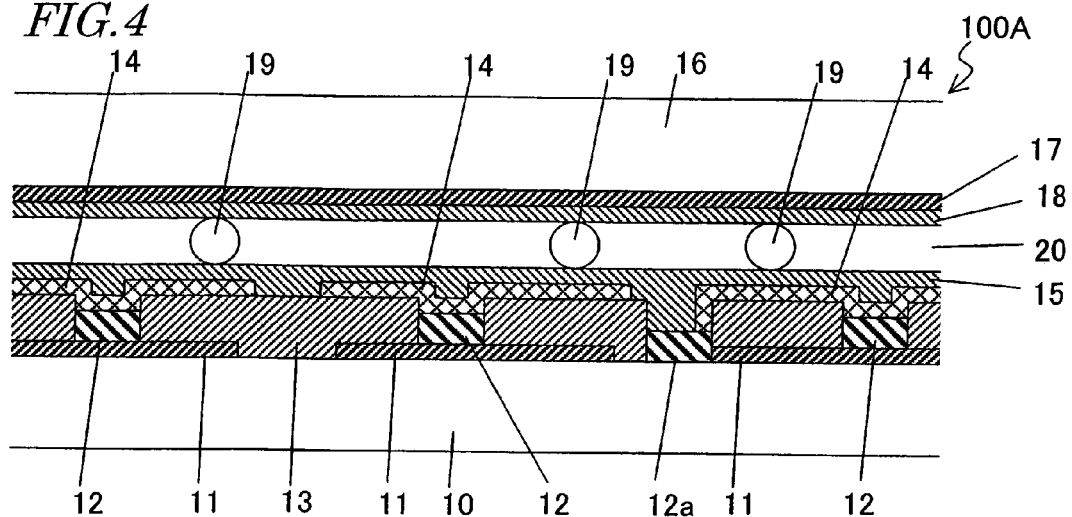
FIG. 4 is a schematic sectional view of a liquid crystal display 100A according to the embodiment of the present invention.

FIG. 4 is a schematic sectional view of a liquid crystal display 100A according to the embodiment of the present invention. The liquid crystal display 100A has the liquid crystal layer 20 as the display medium layer.

The substrate 10 is a transparent substrate such as a glass substrate, a quartz substrate or a plastic substrate. The first electrodes 11 are formed like stripes with a thickness of about 100 or more by using a transparent conductive material such as ITO or $SnO_2$, for instance. The bidirectional two-terminal elements 12 are cylindrical with a diameter of approximately 11 μm for instance, and the first electrodes 11 are formed to have the spacing exceeding 11 μm. Therefore, the bidirectional two-terminal elements 12 which are randomly placed prevent the adjacent first electrodes 11 from shorting out.

The interlayer insulation film 13 is formed on the insulating substrate 10 having the bidirectional two-terminal elements 12 placed thereon. The height of the bidirectional two-terminal element 12 is approximately 3 μm, and the interlayer insulation film 13 is formed to be thicker than it. The interlayer insulation film 13 is formed by the method described by referring to FIG. 3.

The picture electrodes 14 are subsequently formed. In the case of using transmitted light, a transparent conductive film such as ITO is formed as a film of 100 to 200 nm thickness, patterned by the photolithographic process, and is etched with a solution including iron chloride and hydrochloric acid, for instance, so as to form the picture electrodes 14. In the case of using the reflected light, a metal film of Al and so on or a laminated metal film of Al/Mo and soon is formed. For instance, in the case of Al, it is formed to have thickness of 100 to 200 nm or so, and in the case of the laminated metal film, to have thickness of Al/Mo=100 to 150 nm/50 to 100 nm or so. Thereafter, it is patterned by the photolithographic process, and is etched with a solution including oxalic acid and so on so as to form the picture electrodes 14.

Subsequently, a first orientation film 15 is formed as required. The first orientation film 15 is formed by forming a polyimide film through screen-printing and rubbing it in a predetermined direction.

As with the first substrate 10, the second substrate 16 is also the transparent substrate such as the glass substrate, quartz substrate or plastic substrate. In the case of a reflective display device, however, it is sufficient that, of the first substrate 10 and the second substrate 16, the substrate placed on an observation side is at least translucent. The first substrate 10 and the second substrate 16 may also be film-like configuration.

The second electrodes 17 provided on the liquid crystal layer 20 side of the second substrate 16 are stripe-like transference electrodes 17. The transference electrode 17 is comprised of ITO, $SnO_2$ and so on, and has thickness of approximately 100 nm or more. The direction in which the second electrodes 17 extend is perpendicular to the direction in which the first electrodes 11 extend, where each second electrode 17 overlaps the picture electrode 14 so that the overlapping portion constitutes an individual pixel. The second electrodes 17 have a second orientation film 18 formed thereon as required. The first substrate 10 and the second substrate 16 are placed so as to form a predetermined angle (approximately 90 degrees in the case of a TN mode, for instance) with the rubbing direction of the second orientation film 18 and that of the first orientation film 15.

In order to make the picture electrodes 14 and the second electrodes 17 mutually opposed, the first substrate 10 and the second substrate 16 are stuck together via a spacer 19. The thickness of the liquid crystal layer 20 is determined by adjusting the diameter of the spacer 19. The thickness of the liquid crystal layer 20 is 3.5 to 5 μm or so for instance. The liquid crystal layer 20 is formed by injecting a liquid crystal material between the first substrate 10 and the second substrate 16 and sealing it. The liquid crystal display 100A is thus obtained.

As described above, it is not necessary to manufacture the bidirectional two-terminal elements 12 in the manufacturing process of the liquid crystal display 100A so that, for instance, the bidirectional two-terminal elements 12 separately made in an existing semiconductor factory may be used. Therefore, the expensive equipment such as a plasma CVD apparatus essential in the manufacturing process of the liquid crystal displays in the past are unnecessary. Furthermore, the photolithographic process requiring correct alignment is only the step of patterning the picture electrodes 14, and so the steps requiring the correct photomask alignment are remarkably reduced. For this reason, the number of expensive photolithographic process apparatuses can be reduced, and a throughput is also improved. Thus, the liquid crystal display 100A according to the embodiment of the present invention can be manufactured at a lower cost than in the past.

Figure 5:
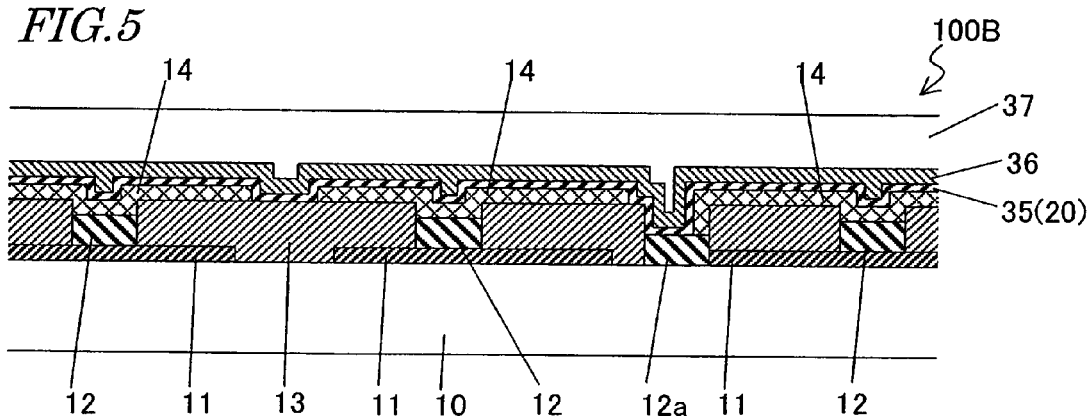
FIG. 5 is a schematic sectional view of an organic EL display device 100B according to the embodiment of the present invention.

FIG. 5 shows a schematic sectional view of an organic EL display device 100B according to the embodiment of the present invention.

The organic EL display device 100B has a light emitting layer 35 as the display medium layer 20. The display medium layer 20 may further include an electron hole transporting layer and/or an electron transporting layer in addition to the light emitting layer 35, where a public configuration of an organic EL element may be widely adopted. Display is performed by supplying a current to the display medium layer 20 (the light emitting layer 35) provided between the picture electrodes 14 and second electrodes 36. Moreover, a protective layer 37 for protecting the display medium layer 20 is formed to cover almost the entire surface of the first substrate 10. It is also possible to place the second substrate (not shown) instead of the protective layer 37 and join the first substrate 10 and the second substrate together by using a sealing agent or the like so as to protect the light emitting layer 35.

The light emitting direction may be either the first substrate 10 side or the protective layer 37 side. In the case of emitting the light on the first substrate 10 side, the first substrate 10, first electrodes 11 and picture electrodes 14 are constituted by a transparent material, and the second electrodes 36 is the reflectors. In the case of emitting the light on the protective layer 37 side, the picture electrodes 14 is the reflectors, and the second electrodes 36 is the transference electrodes.

The organic EL display device 100B is manufactured by the following method, for instance. As the method described above by referring to FIG. 3 is performed up to the formation of the picture electrodes 14 and placement of the bidirectional two-terminal elements 12, a description thereof will be omitted here.

In the case the picture electrodes 14 are formed with the ITO, 100 to 200 nm in thickness of copper phthalocyanine, 50 nm or so of a electron hole transporting material such as α-NPD, and 50 nm or so of a light emitting material such as Alq3 (8-hydroxyquionoline aluminum) are sequentially laminated on the picture electrodes 14 so as to form the light emitting layer 35. It is also possible to form the light emitting layer 35 by sequentially laminating 50 nm or so of the light emitting material such as Alq3, 50 nm or so of the electron hole transporting material such as α-NPD (N, N-Di (naphthalene-1-yl) —N, N'-diphenyl-benzidine), and 100 to 200 nm of copper phthalocyanine on the picture electrodes 14.

Next, the second electrodes 36 are formed. In the case where the second electrodes 36 contact Alq3, Al is used as an electrode material, and film thickness thereof may be 100 to 200 nm. Thereafter, stripe-like patterning is performed in the photolithographic process to be perpendicular to the first electrodes 11 and overlap the picture electrodes 14 so as to form the stripe-like second electrodes 36. In this case, it is also possible to perform the stripe-like patterning to the light emitting layer 35 by etching it using the second electrodes 36 as the masks.

In the case where the second electrodes 36 contact the copper phthalocyanine, Au is used as an electrode material, and film thickness thereof may be 100 to 200 nm. Thereafter, the stripe-like patterning is performed in the photolithographic process to be perpendicular to the first electrodes 11 and overlap the picture electrodes 14 so as to form the stripe-like second electrodes 36. In this case, it is also possible to perform the stripe-like patterning to the light emitting layer 35 by etching it using the-second electrodes 36 as the masks.

In the case where the picture electrodes 14 are formed by using Al or Al/Mo, 50 nm or so of the light emitting material such as Alq3, 50 nm or so of the electron hole transporting material such as α-NPD, and 100 to 200 nm of copper phthalocyanine are sequentially laminated on Al so as to form the light emitting layer 35.

Next, the second electrodes 36 are formed with the ITO, and the film thickness thereof may be 100 nm or more. The stripe-like patterning is performed in the photolithographic process to be orthogonal to the first electrodes 11 and overlap the picture electrodes 14 so as to form the stripe-like second electrodes 36. In this case, it is also possible to perform the stripe-like patterning to the light emitting layer 35 by etching it using the second electrodes 36 as the masks.

Subsequently, the protective layer 37 is formed. As the protective layer 37 needs to have a property of filtering out no moisture, a silicon nitride film is grown by the CVD method and so on for instance, and the film thickness thereof is 3 μm or so. Thereafter, the terminal portion is exposed in order to apply an electrical signal to the first electrodes 11 and the second electrodes 36. The protective layer 37 of the first electrodes 11 and the second electrodes 36 positioned outside the display area and the light emitting layer 35 if remaining are eliminated. In this case, it is possible to eliminate the silicon nitride film either by wet etching with buffered hydrofluoric acid and so on or by dry etching with $CF_4$ for instance.

Figure 6:
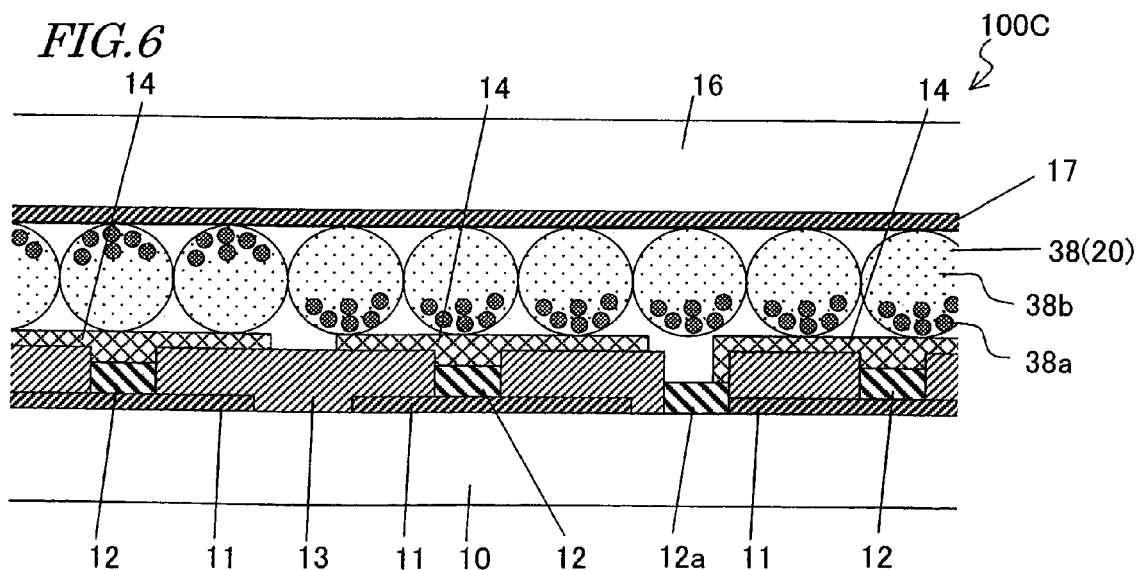
FIG. 6 is a schematic sectional view of a microcapsule-type electrophoresis display device 100C according to the embodiment of the present invention.

FIG. 6 is a schematic sectional view of a microcapsule-type electrophoresis display device 100C according to the embodiment of the present invention.

The display medium layer 20 of the electrophoresis display device 100C has a microcapsule 38. The microcapsule 38 formed with a transparent material has white particles 38a and blue liquid 38b encapsulated therein. As for the microcapsule 38, the one disclosed in Japanese Patent Laid-Open No. 1-86116 may be suitably used, for instance. A voltage is applied between the picture electrodes 14 and second electrodes 17, and black and white color particles are electrophoresed so as to display an image comprised of white and blue.

As it can be made by the same method as the one described by referring to FIG. 3 other than using the microcapsule 38 as the display medium layer 20, a description of the manufacturing method will be omitted. Moreover, the picture electrode 14 may be either the transference electrode or reflector. In addition, the display medium layer 20 comprised of the microcapsule 38 can be implemented by using a known coating method and so on.

Figure 7:
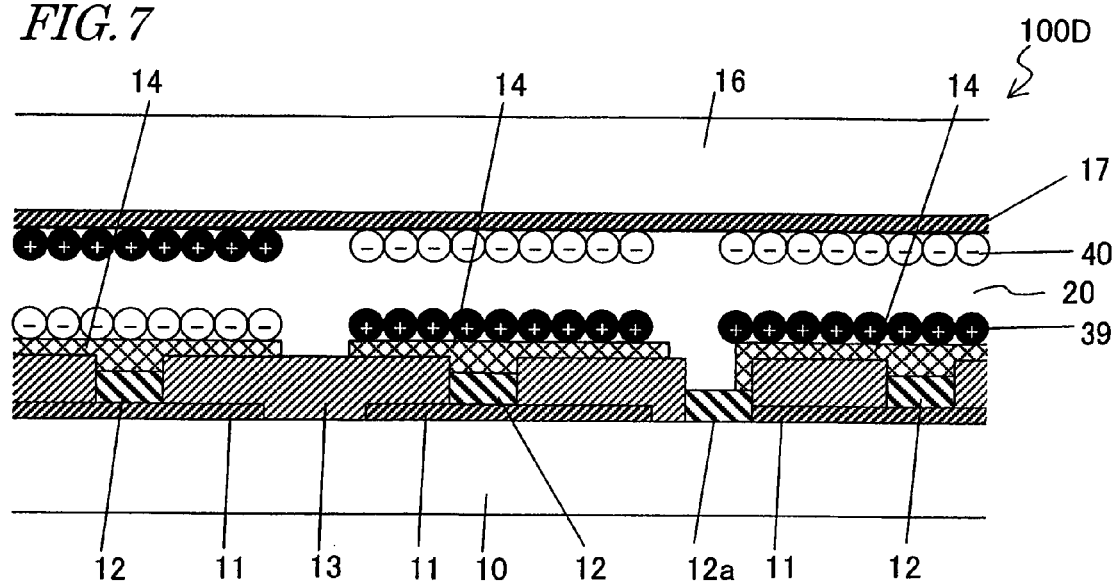
FIG. 7 is a schematic sectional view of a toner display device 100D according to the embodiment of the present invention.

FIG. 7 is a schematic sectional view of a toner display device 100D according to the embodiment of the present invention.

The display medium layer 20 of the toner display device 100D has a black toner 39 and white particles 40. For instance, sphere-like resin particles containing a carbon black pigment is used for the black toner 39, and the sphere-like resin particles containing a titanium oxide pigment is used for the white particles 40. An image comprised of black and white is displayed by applying the voltage between the picture electrodes 14 and second electrodes 17 and moving the black and white color particles between the substrates. The basic principle of operation of the toner display device is described in the collected papers Japan Hardcopy 2001 for instance.

As it can be made by the same method as the one described by referring to FIG. 3 other than using a mixture of the black toner 39 and white particles 40 as the display medium layer 20, a description of the manufacturing method thereof will be omitted. Moreover, the display medium layer 20 is formed by, after dispersing the black toner 39 and white particles 40 on the surfaces of the first substrate 10 or second substrate 16, joining these substrates together by providing a predetermined spacing, for instance. The picture electrode 14 may be either the transference electrode or reflector.

Figure 8:
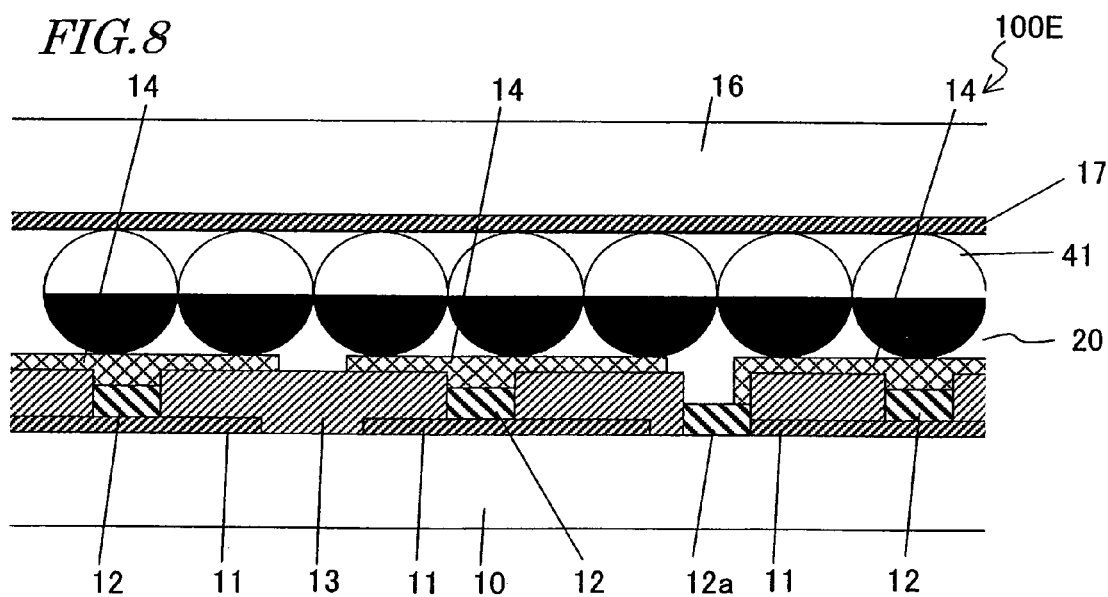
FIG. 8 is a schematic sectional view of a twist-ball-method display device 100E according to the embodiment of the present invention.

FIG. 8 is a schematic sectional view of a twist-ball-method display device 100E according to the embodiment of the present invention.

The twist-ball-method display device 100E has a layer in which two-color particles 41 are dispersed in the resin (silicone resin for instance) as the display medium layer 20. As for the two-color particles 41, the white side becomes negatively charged and the black side becomes positively charged, for instance, so as to form an electric doublet. It performs the display by changing the orientation of the two-color particles 41 according to the voltage between the picture electrodes 14 and second electrodes 17. The basic principle of operation of the twist-ball-method display device is described in U.S. Pat. No. 4,126,854, for instance.

As it can be made by the same method as the one described by referring to FIG. 3 other than using the resin layer in which two-color particles 41 are dispersed as the display medium layer 20, a description of the manufacturing method will be omitted. Moreover, the display medium layer 20 is formed by, after coating the surfaces of the first substrate 10 or second substrate 16 with the resin layer in which the two-color particles 41 are dispersed, joining these substrates together, for instance. The picture electrode 14 may be either the transference electrode or reflector.

Figure 9:
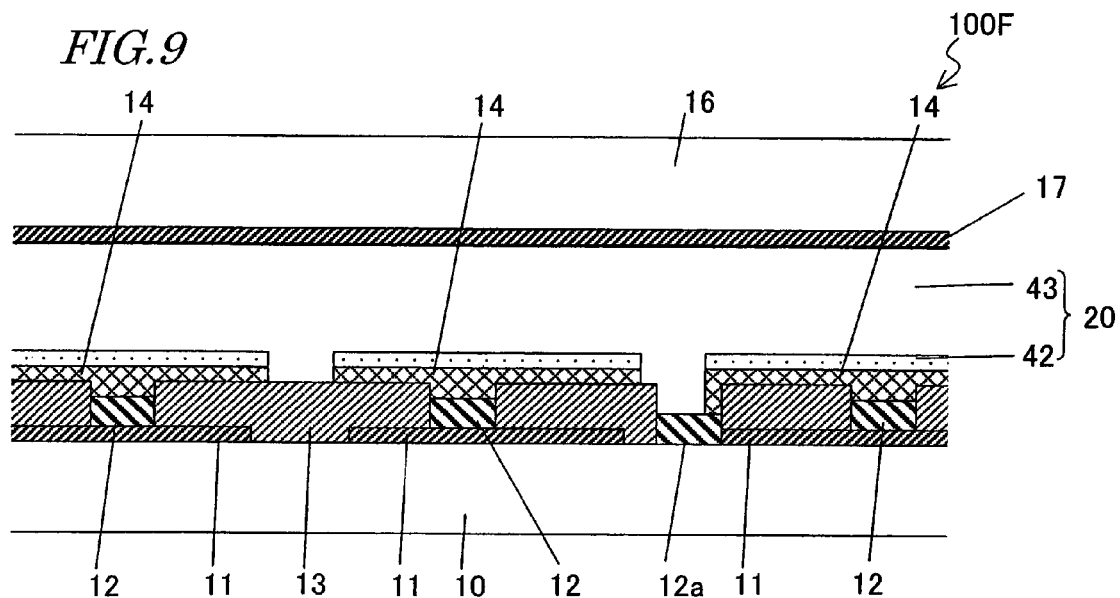
FIG. 9 is a schematic sectional view of an electrochromic display device 100F according to the embodiment of the present invention.

FIG. 9 is a schematic sectional view of an electrochromic display device 100F according to the embodiment of the present invention.

The display medium layer 20 of the electrochromic display device 100F is comprised of a $WO_3$ layer 42 of approximately 0.3-to-1.0μm thickness and an electrolytic layer 43 such as lithium perchlorate. It performs the display by an electrochromic reaction of the $WO_3$ layer according to the voltage applied between the picture electrodes 14 and second electrodes 17. The basic principle of operation of the electrochromic display device is described in Philos. Mag. vol.27, p. 801 (1973), for instance.

As it can be made by the same method as the one described by referring to FIG. 3 other than using the $WO_3$ layer 42 and electrolytic layer 43 as the display medium layer 20, a description of the manufacturing method will be omitted. Moreover, the display medium layer 20 is formed by, after joining together the first substrate 10 having the $WO_3$ layer 42 formed on the picture electrodes 14 and second substrate 16, injecting the electrolyte in the gap thereof. The picture electrode 14 may be either the transparent electrode or reflector.

Figure 10:
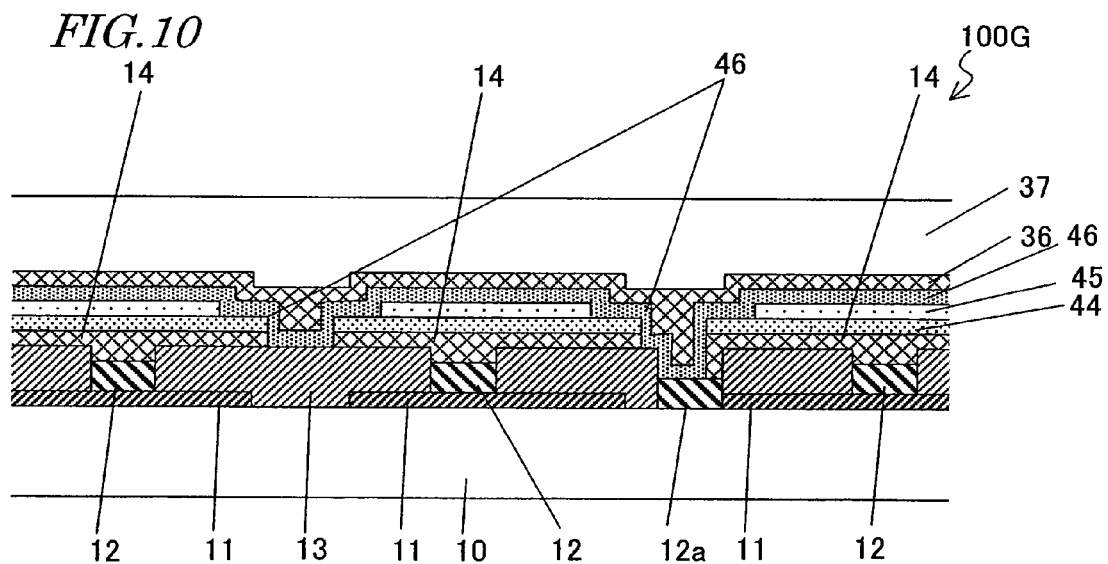
FIG. 10 is a schematic sectional view of a display device 100G using a porous Si according to the embodiment of the present invention.

FIG. 10 is a schematic sectional view of a display device 100G using a porous silicon according to the embodiment of the present invention.

The display medium layer 20 of the display device 100G using the porous silicon is formed with a Si layer 44 formed on the picture electrodes 14, a porous Si layer 45 formed on the Si layer 44, and a SiNx layer 46 formed on the porous Si layer 45. It performs the display as the porous Si layer 45 emits the light according to the voltage applied between the picture electrodes 14 and second electrodes 36. Si is originally an indirect-transition semiconductor which does not generally emit the light. However, if the crystalline particle diameter of Si becomes 10 nm or less, the electrons and holes are trapped in so that direct-transition recombination occurs and it emits the light (refer to Applied Physics Letters, vol. 57, p. 1046, 1990 and Applied Physics Letters, vol. 60, p. 347, 1992, for instance). The display device 100G is formed so that the protective layer 37 for protecting the display medium layer 20 covers almost the entire surface of the first substrate 10.

As it can be made by the same method as the one described by referring to FIG. 3 other than using the Si layer 44, porous Si layer 45 and SiNx layer 46 as the display medium layer 20, a description of the manufacturing method will be omitted. Moreover, the Si layer 44 is formed by, after being deposited by using a known film deposition technology, patterning it by the dry etching method with $HCl+SF_6$ mixed gas. The porous Si layer 45 is formed, for instance, by forming an anode of the porous Si in an HF water solution (a current density of 20 mA/$cm^2$ for instance). It can also be formed by depositing Si like dots by the plasma CVD method. The picture electrode 14 may be either the transference electrode or reflector.

Figure 11:
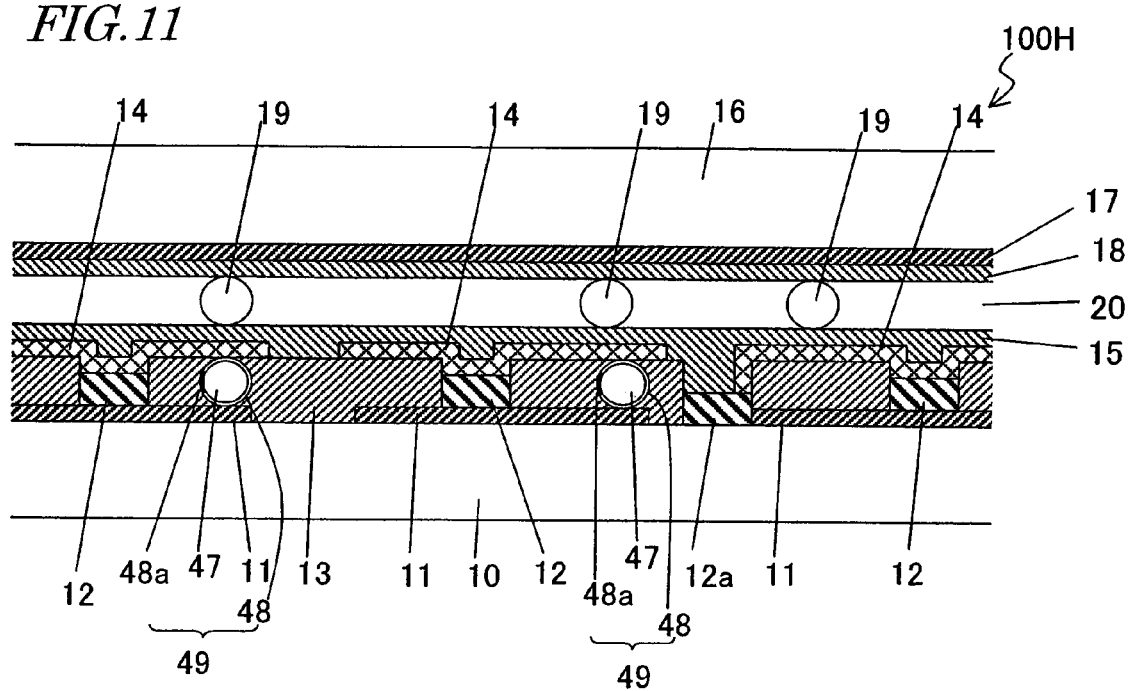
FIG. 11 is a schematic sectional view of a light-scanning liquid crystal display 100H according to the embodiment of the present invention.

FIG. 11 is a schematic sectional view of a light-scanning liquid crystal display 100H according to the embodiment of the present invention.

The liquid crystal display 100H has light leading paths 49 provided in parallel with the first electrodes 11. The light leading path 49 is placed on one end of the first electrode 11 in the width direction, and has a high refractive index portion 48a on the other end side in the width direction of the first electrode 11 of a cladding 48 covering a core 47 of the light leading path 49. The light emitted from the high refractive index portion 48a side enters from a side surface of the laminated semiconductor structure of the bidirectional two-terminal element 12 so that the bidirectional two-terminal elements 12 will be in an on state. The bidirectional two-terminal element 12 used here does not have the light shielding layer 28 on its side surface. The high refractive index portion 48a is formed, for instance, by partially ion-exchanging the cladding 48. Other configuration may be substantially the same as the liquid crystal display 10A shown in FIG. 4.

The liquid crystal display 100H is manufactured as follows for instance. As described by referring to FIG. 3, after forming the first electrodes 11, the light leading paths (optical fiber) 49 made in advance are placed in parallel with the first electrodes 11. As for the process thereafter, the liquid crystal display 100H is obtained by undergoing the same process as that of the liquid crystal display 100A. Moreover, the picture electrode 14 is the reflector.

While the light-scanning liquid crystal display was illustrated, an addressing method using the light is applicable to other display devices as well. An optical address display device to which the present invention is applicable is described in Japanese Patent Laid-Open No. 6-301050 for instance.

FIGS. 19(a) to (f) are schematic sectional views for describing the manufacturing method of the display device 101 according to the embodiment of the present invention. The display device shown in FIG. 19 is a liquid crystal display. However, this embodiment is not limited to it.

First, as shown in FIG. 19(a), banks 60 are formed on the principal surface of the substrate 10 such as a glass substrate. The banks 60 are formed as follows for instance. First, a photosensitive resin is applied to the principal surface of the substrate 10. Thereafter, the applied photosensitive resin is exposed and developed by a method in the public domain so as to pattern it in a form surrounding the regions forming the first electrodes 11 (hereafter, referred to as "first electrode formation region") of the principal surface of the substrate 10. The patterned photosensitive resin is baked as required to form the banks 60. The height of the banks 60 in a direction vertical to the substrate 10 is set to securely prevent the coating solution from expanding to the region other than the first electrode formation region.

Subsequently, as shown in FIG. 19(b), the first electrodes 11 and the bidirectional two-terminal elements 12 connected to the first electrodes are integrally formed in each region surrounded by the banks 60. First, there is the prepared coating solution in which the conductive particles having a particle diameter of 30 nm or so created from metals such as Al, Cu, Ag, Ni, Pd and W and metallic oxide particles such as ITO and the bidirectional two-terminal elements are dispersed in the solvent made of water, IPA, n-methyl-pyrrolidone, n-octanol, iso-butanol, ethylene-glycol, toluene and so on.

Next, the coating solution is provided on the principal surface of the substrate 10 by the inkjet method. In this case, it is possible, with the banks 60, to prevent the provided coating solution from expanding to the region other than the first electrode formation region. Thereafter, elimination of the solvent included in the provided coating solution (and baking of the binder) is performed. For instance, in the case of using the coating solution in which the bidirectional two-terminal elements are mixed in an off-the-shelf coating ITO solution, it is heated at 160° C. for 30 minutes for instance. In the case of baking the binder, baking temperature is 150 to 200° C. for instance, and baking time is 30 to 60 minutes for instance. Thus, the first electrodes 11 are formed in the first electrode formation region, and the bidirectional two-terminal elements 12 are randomly placed on the first electrodes 11.

Next, as shown in FIG. 19(c), the banks 60 are eliminated. The method for eliminating the banks 60 is not limited in particular. It is possible, for instance, to exfoliate the banks 60 by using the solvent such as SPX or DMSO or eliminate the banks 60 by a plasma treatment in an oxygen atmosphere.

Thereafter, as shown in FIG. 19(d), the interlayer insulation film 13 is formed on the first electrodes 11 by using the insulating material including the photosensitive resin. The interlayer insulation film 13 is formed by the same method as described by referring to FIG. 18. It is also possible, after forming the interlayer insulation film 13, to perform the plasma treatment in the oxygen atmosphere in order to ensure the connections between the bidirectional two-terminal elements 12 and the picture electrodes 14.

Subsequently, as shown in FIG. 19(e), the picture electrodes 14 are formed on the interlayer insulation film 13. The picture electrodes 14 are formed to be electrically connected to the first electrodes 11 via the bidirectional two-terminal elements 12. The picture electrodes 14 may be formed by using a transparent electrode film such as ITO (in the case of using transmitted light) or a metallic film of high reflectance such as Al and Ag (in the case of using reflected light), by the same method as that for forming the picture electrodes 14 of the display device 100 described by referring to FIG. 3.

The process thereafter may be the same as that described by referring to FIG. 4. An example thereof is shown below.

An orientation film 15 is formed on the picture electrodes 14 by the same method as described by referring to FIG. 4.

A further insulating transparent substrate 16 is prepared, and second electrodes 17 are formed on the substrate 16. For instance, a transparent conductive material such as ITO is used to form a conducting layer having a thickness of about 100 nm or more on the surface of the substrate 16 by using the sputtering method. Subsequently, the conducting layer is patterned by the photo-etching method so as to form the stripe-like second electrodes 17. An orientation film 18 is formed as required on the second electrodes 17.

Thereafter, the first substrate 10 and the second substrate 16 are glued together via a spacer 19 so that the picture electrodes 14 and the second electrodes 17 are mutually opposed. A liquid crystal material is injected between the first substrate 10 and the second substrate 16, and they are sealed to form a liquid crystal layer 20. Thus, the liquid crystal display shown in FIG. 19(f) is obtained.

FIGS. 21(a) to (h) are schematic sectional views for describing the manufacturing method of the display device 101 according to the embodiment of the present invention. The display device shown in FIGS. 21 is the liquid crystal display. However, this embodiment is not limited to it.

First, the banks 60 are formed on the principal surface of the glass substrate 10 by the same method as described by referring to FIG. 19(a) (FIG. 21(a)). The banks 60 are formed almost vertically on the principal surface of the substrate 10 as if to surround each region forming the first electrodes 11 (first electrode formation region) of the principal surface of the substrate 10.

Next, as shown in FIG. 21(b), the conductive coating solution in which the metallic particles such as Al having the particle diameter of 30 nm or so are dispersed in the solvent such as water is provided by the inkjet method only to each region surrounded by the banks 60 of the principal surface of the substrate 10. As for the conductive coating solution, the same conductive coating solution as that described by referring to FIG. 20(*a*) may be used. Thereafter, the solvent included in the provided conductive coating solution is eliminated (and the binder is baked). Thus, the first electrodes 11 are formed in the first electrode formation region.

Next, as shown in FIG. 21(*c*), the bidirectional two-terminal elements 12 are placed only on the first electrodes 11. First, the conductive particles (particle diameter of 30 nm or so) such as Al, Cu or ITO, a photosensitive material such as a positive photosensitive resin and the bidirectional two-terminal elements are dispersed in the solvent such as water so as to prepare the coating material 52'. The coating material 52' may be the same as that described by referring to FIG. 20(*b*). The coating material 52' is provided only on the first electrodes 11 by using the inkjet method. Thus, the bidirectional two-terminal elements 12 are randomly placed on the first electrodes 11.

Thereafter, leaving the coating material 52' existing between the first electrodes 11 and the bidirectional two-terminal elements 12, other coating material 52' is selectively eliminated by the same method as described by referring to FIG. 3(*c*) (FIG. 21(*d*)). As previously mentioned, if the coating material 52' includes the positive photosensitive resin, it is possible to expose the coating material 52' by using the bidirectional two-terminal elements 12 as the photomasks so as to obtain the structure as in FIG. 21(*d*) in a self-aligning manner.

Subsequently, as shown in FIG. 21(*e*), the banks 60 are eliminated. The banks 60 are eliminated by the same method as described by referring to FIG. 19(*c*) for instance.

The processes shown in FIGS. 21(*f*) to (*h*) are substantially the same as those described by referring to FIGS. 19(*d*) to (*f*).

[Bidirectional Two-Terminal Element]

A description will be given by referring to FIGS. 12(*a*) and (*b*) and FIGS. 13(*a*) to (*e*) as to the structure and manufacturing method of the bidirectional two-terminal element 12 according to an embodiment of the present invention. While the bidirectional thyristor is illustrated here, any bidirectional two-terminal element having the same functions may be used for the above-mentioned display devices.

Figure 12:
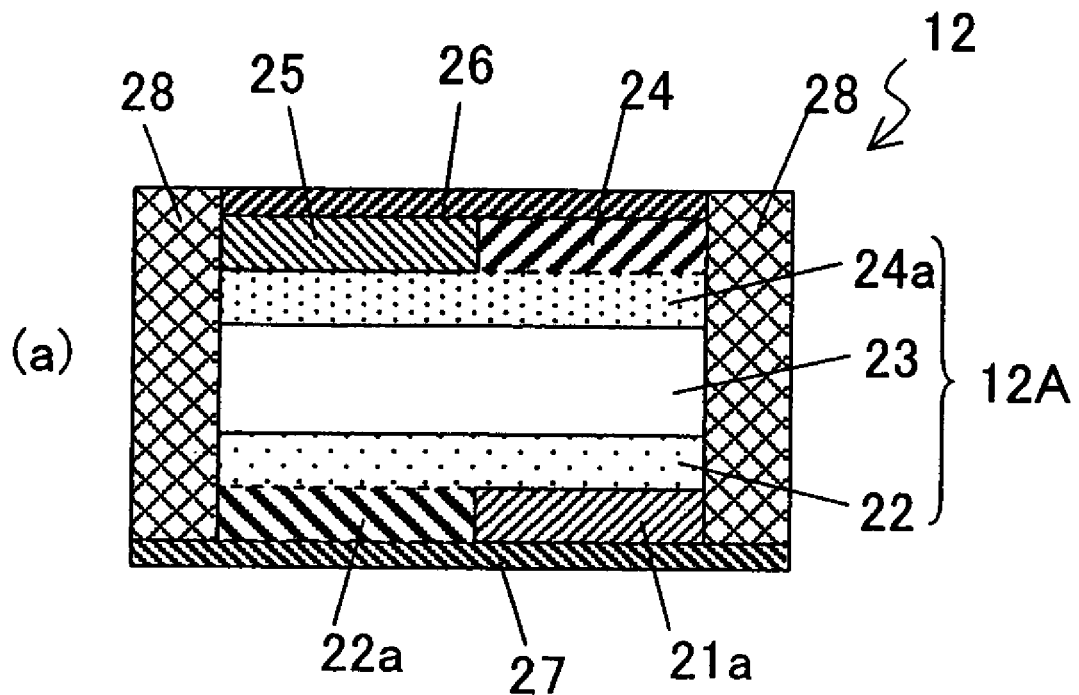
FIGS. 12(a) and (b) are schematic sectional views of bidirectional two-terminal elements 12 and 12' according to the embodiment of the present invention respectively.
Figure 12:
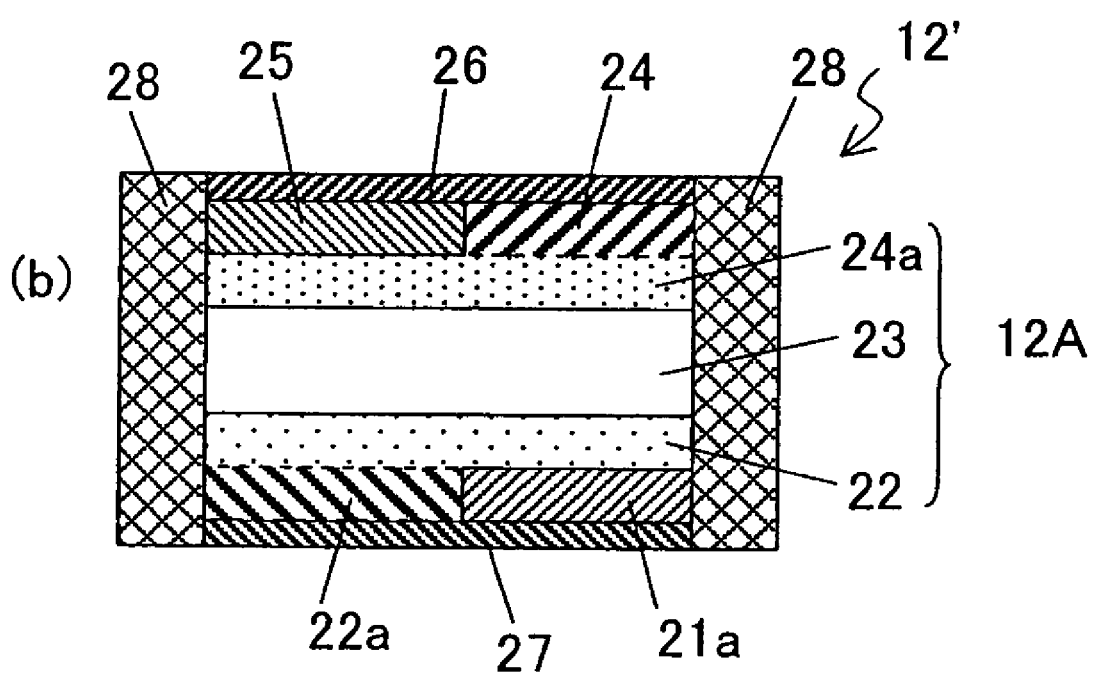

As schematically shown in the sectional views of the structure in FIGS. 12(*a*) and (*b*), the bidirectional two-terminal element 12 and 12' of the embodiment have a pair of electrodes 26 and 27 and laminated semiconductor structure 12A disposed between them. The laminated semiconductor structure 12A has vertically symmetrical structures adjacently formed. Furthermore, the light shielding layer 28 is formed on the side surface of the laminated semiconductor structure 12A. In the case of optically addressing the bidirectional two-terminal element 12 as with the liquid crystal display 100H, the light shielding layer 28 is omitted.

The bidirectional two-terminal element 12 is preferably cylindrical, for instance, so that, when placing it on the substrate, the electrodes 26 or 27 can be stably placed in contact with the surface of the substrate. The diameter of the cylindrical bidirectional two-terminal element is preferably larger than the height, and it is desirably three times or more. For instance, the diameter is 11 μm or so and the height is 3 μm or so.

The laminated semiconductor structure 12A has, between the electrodes 27 and 26, a region wherein a first conductive-type first semiconductor layer 21a, a second conductive-type second semiconductor layer 22, a first conductive-type third semiconductor layer 23, a second conductive-type fourth semiconductor layer 24a and a second conductive-type fifth semiconductor layer 24b are laminated in this order from the electrode 27 side, and a region wherein a second conductive-type first semiconductor layer 22a, a second conductive-type second semiconductor layer 22, a first conductive-type third semiconductor layer 23, a second conductive-type fourth semiconductor layer 24a and a first conductive-type second semiconductor layer 25 are laminated in this order.

The bidirectional two-terminal element according to the embodiment of the present invention is suitably manufactured by the following method.

First, the substrate having the insulating layer and the semiconductor layer on that insulating layer is prepared. A bidirectional laminated semiconductor structure having a predetermined shape including the semiconductor layer is formed on the insulating layer. The method described later may be suitably used as the method of forming the bidirectional laminated semiconductor structure. A first electrode layer is formed on the obtained bidirectional laminated semiconductor structure, and the first electrode layer is adhered to another substrate. The bidirectional laminated semiconductor structure is separated from the substrate by eliminating the insulating layer in a state of having the first electrode layer adhered. To be more specific, the bidirectional laminated semiconductor structure is transferred to the other substrate. Thereafter, a second electrode layer is formed on the semiconductor layer of the bidirectional laminated semiconductor structure so as to obtain the bidirectional two-terminal element.

A first manufacturing method of the bidirectional two-terminal element 12 will be described by referring to FIGS. 13(*a*) to (*e*).

Figure 13:
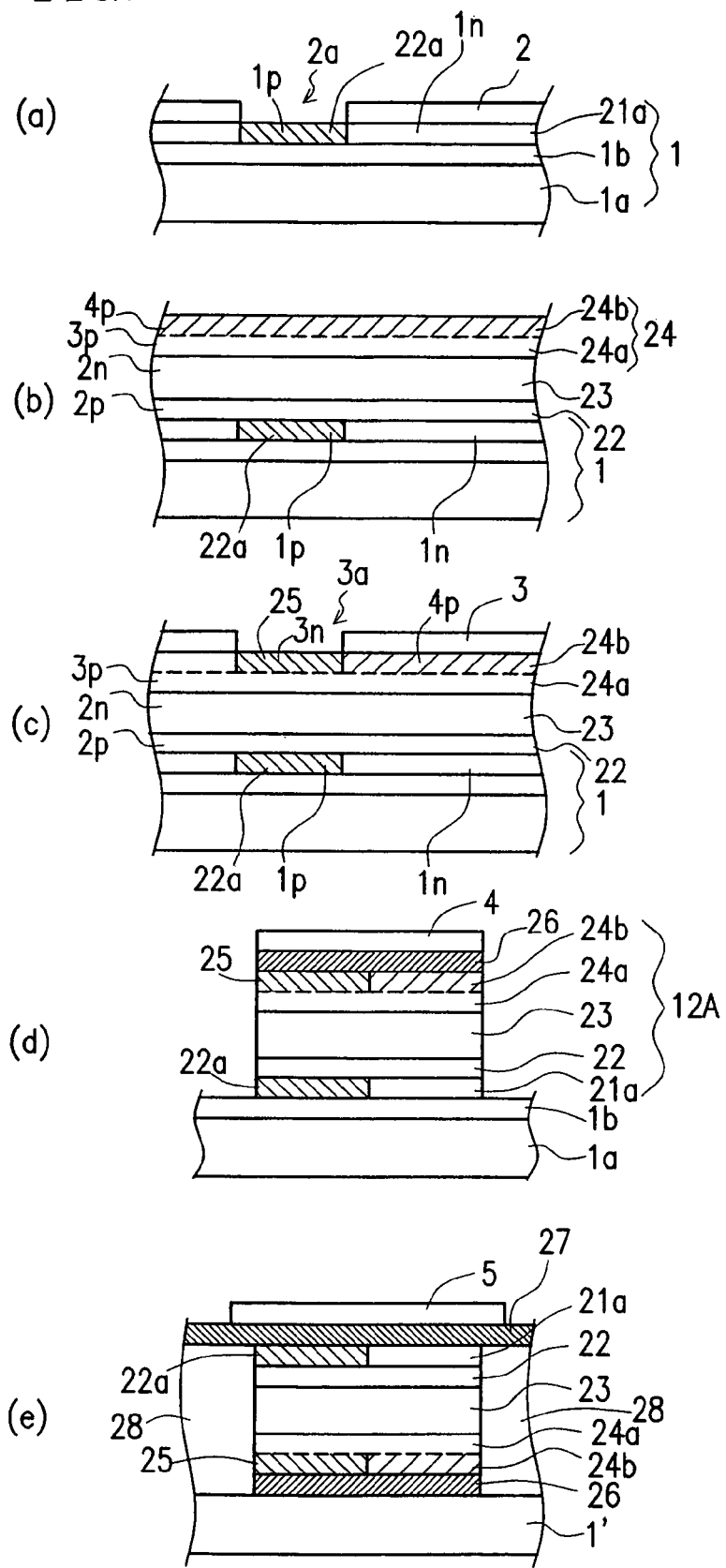
FIGS. 13(a) to (e) are schematic sectional views for explaining the manufacturing method of the bidirectional two-terminal elements 12 and 12' according to the embodiment of the present invention respectively.

First, as shown in FIG. 13(*a*), a substrate 1 having an insulating layer 1b and the first conductive-type (n) first semiconductor layer 21a on the insulating layer 1b is prepared. The insulating layer 1b is an embedded layer of oxides, for instance. Impurities are selectively injected into the semiconductor layer 21a via a mask 2 having an opening 2a so as to form a second conductive-type first semiconductor region 22a.

Next, as shown in FIG. 13(*b*), the second conductive-type second semiconductor layer 22 is deposited on the first semiconductor layer 21a including the first semiconductor region 22a. Subsequently, the first conductive-type third semiconductor layer 23 is deposited on the second semiconductor layer 22. Furthermore, the second conductive-type fourth semiconductor layer 24a is formed on the third semiconductor layer 23, and the second conductive-type fifth semiconductor layer 24b having higher density of impurities than the fourth semiconductor layer 24a is formed on the fourth semiconductor layer 24a.

Next, as shown in FIG. 13(*c*), the impurities are selectively injected via a mask 3 having an opening 3a so as to form a first conductive-type second semiconductor region 25 in the region located on the first semiconductor region 22a of the fifth semiconductor layer 24b.

Next, as shown in FIG. 13(*d*), a first electrode layer 26 is formed on the fifth semiconductor layer 24b including the second semiconductor layer 25. Thereafter, a mask 4 having a predetermined shape is used to perform etching up to the insulating layer 1b and thereby pattern the first electrode layer 26, second semiconductor region 25, fifth semiconductor layer 24b, fourth semiconductor layer 24a, third semiconductor layer 23, second semiconductor layer 22, first semiconductor region 22a and first semiconductor layer 21a in predetermined shape so as to obtain the laminated semiconductor structure 12A having predetermined shape on the insulating layer 1b.

Thereafter, as shown in FIG. 13(e), the first electrode layer 26 is adhered to the other substrate 1'. The laminated semiconductor structure 12A is separated from the substrate 1' by eliminating the insulating layer 1b in a state of having the first electrode layer 26 adhered to the other substrate 1'. Thereafter, the light shielding layer 28 is formed to cover the separated laminated semiconductor structure 12A.

Subsequently, a portion of the light shielding layer 28 is eliminated and the surfaces of the first semiconductor layer 21a and first semiconductor region 22a of the laminated semiconductor structure 12A are thereby exposed so as to form a second electrode layer 27 on the surfaces of the exposed first semiconductor layer 21a and first semiconductor region 22a of the laminated semiconductor structure 12A. Thereafter, a mask having a predetermined shape is used to pattern a portion of the second electrode layer 27 and light shielding layer 28 having a predetermined shape so as to obtain the bidirectional two-terminal elements 12 shown in FIG. 12(a).

It is possible, by controlling the material, thickness and density of impurities of each layer (or region) constituting the laminated semiconductor structure 12A, to adjust a turn-on voltage of the bidirectional two-terminal elements 12.

Hereafter, a description will be given, by referring to FIGS. 13(a) to (e) again, as to the specific manufacturing method of the bidirectional two-terminal element 12 suitably used for the display devices 100A, 100B, 100F to 100H, and 101.

An n-type silicon wafer 1 having an embedded oxide film layer 1b is masked with an oxide film 2 and so on to protect a first n-type region 21a, and the impurities capable of forming a p-type layer such as boron are introduced so as to form a first p-type region 22a. In this case, the density of impurities of the first p-type region 22a is in ohmic contact between it and the second metal electrode layer 27.

After eliminating the mask, a second p-type region 22 is grown by the CVD method and so on. Thereafter, a second n-type region 23 is grown by the CVD method and so on. In this case, the density of impurities and film thickness of the second n-type region 23 are appropriately selected to render the turn-on voltage of the bidirectional two-terminal elements 12 as an appropriate voltage for driving. For instance, the density of impurities of the second n-type region 23 is rendered to be $5.7 \times 10^{16}$ cm$^{-3}$ or so on completion of element production and the film thickness is rendered to be 590 nm or more so that the turn-on voltage of the bidirectional two-terminal elements can be 15V or so.

After forming the second n-type region 23, the third p-type region 24a is grown by the CVD method and so on. In this case, the density of impurities of an upper region 24b of the third p-type region 24a is rendered to be in ohmic contact with the first metal electrode 26.

Thereafter, an oxide film 3 having the opening 3a is formed at a position equivalent to a third n-type region 25 on the fourth p-type region 24b, and the impurities capable of forming a n-type region such as phosphorus are introduced so as to form the third n-type region 25.

Thereafter, the first metal electrode 26 is film-formed by a sputtering method and so on. In this case, Ti, W and so on are selected, for instance, so that the first metal electrode 26 is in ohmic contact with the fourth p-type region 24b and, third n-type region 25. It may also be the laminated structure such as Al/Ti or ITO/Ti.

Thereafter, the patterning is performed by the photolithographic process and soon, and the etching is performed until it reaches the embedded oxide film layer 1b by means of dry etching and so on. In this case, a round shape is desirable as the shape of the patterning, but it may also be another shape.

Thereafter, the first metal electrode 26 is adhered to the other substrate 1' and the embedded oxide film layer 1b is eliminated by the buffered hydrofluoric acid and so on so as to transfer the laminated semiconductor structure 12A to the other substrate 1'.

Thereafter, the light shielding layer 28 is film-formed with a resin capable of light shielding and so on. After film-forming the light shielding layer 28, polishing is performed by the chemical mechanical polishing (CMP) method and so on until the first n-type region 21a and the first p-type region 22a appear so as to film-form a metal film 27 thereafter. In this case, Ti, W and so on are selected, for instance, so that the metal film 27 is in ohmic contact with the first p-type region 22a and first n-type region 21a. It may also be the laminated structure such as Al/Ti or ITO/Ti.

Thereafter, the patterning is performed by the photolithographic process and soon, and the etching is performed by dry etching and so on until reaching the other substrate 1' having the first metal electrode 26 adhered thereto so as to form the second metal electrode 27 and light shielding layer 28. While the patterning shape is a round shape in this case, the shape may be arbitrary if corresponding to the arbitrary shape on the above patterning. In addition, although the light shielding layer 28 is perpendicular in FIG. 12, it may be inclined. It is also feasible to form the oxide film, nitride film and so on as a protective coat between the light shielding layer 28 and each semiconductor layer.

As for the above manufacturing method, the following method may be used in the case of using a transparent substrate as the other substrate 1' after transferring the laminated semiconductor structure 12A to the other substrate 1'. In the case of using the following method, a bidirectional two-terminal element 12' having the structure shown in FIG. 12(b) can be obtained.

After transferring the laminated semiconductor structure 12A to the other substrate 1', it is coated with a negative type photoresist so as to perform the exposure from the underside of the other substrate 1' and develop it. The photoresist of the portion corresponding to the laminated semiconductor structure 12A is thereby eliminated.

Thereafter, the second metal electrode 27 is film-formed by a sputtering method and so on. In this case, Ti, W and so on are selected, for instance, so that the second metal electrode 27 is in ohmic contact with the first p-type region 22a and first n-type region 21a. It may also be the laminated structure such as Al/Ti or ITO/Ti.

Thereafter, the photoresist is eliminated so that the second metal electrode 27 on the photoresist is lifted off and only remains on the laminated semiconductor structure 12A. Hereafter, the light shielding layer 28 is formed and the patterning is performed by the same method as described above.

The bidirectional two-terminal element 12' may be obtained by flaking the first metal electrode 26 from the other substrate 1'.

The bidirectional two-terminal elements 12 and 12' are formed so that the density of impurities thereof becomes $N_{A22a} \geq N_{A24b} > N_{D25} \geq N_{D21a} \geq N_{A22} \leq N_{A24a} \leq N_{D23} = 1.5 \times 10^{17}$ cm$^{-3}$. In this case, $N_{A22a}$, $N_{A24b}$, $N_{D25}$, $N_{D21a}$, $N_{A22}$, $N_{A24a}$ and $N_{D23}$ are the densities of impurities of the semiconductor layers or regions 22a, 24b, 25, 21a, 22, 24a and 23 respectively. In addition, the bidirectional two-terminal element 12 is formed so that the film thicknesses of the layers thereof become $d_{21a}$=400 nm, $d_{22a}$=400 nm, $d_{22}$=400 nm, $d_{24b}$=400 nm, $d_{24a}$=400 nm, $d_{25}$=400 nm, $d_{26}$=400 nm and $d_{27}$=400 nm, and $d_{23}$ becomes 590 nm or more. In this case, $d_{21a}$, $d_{22a}$, $d_{22}$, $d_{23}$, $d_{24b}$, $d_{24a}$ and $d_{25}$ are the film thicknesses of the respective regions 21a, 22a, 22, 23, 24b, 24a and 25, and $d_{26}$ and $d_{27}$ are the film thicknesses of the first metal electrode 26 and the second metal electrode 27. The light shielding layer 28 is formed to have a thickness of 30 nm or so. The light shielding layer 28 may be either perpendicular or inclined. However, the light shielding layer 28 is not formed on the bidirectional two-terminal elements 12 and 12' used for the light-scanning display device such as the display device 100H.

It becomes possible, by making the bidirectional two-terminal elements 12 to have a high density by the above-described method, to use the materials more efficiently than making the display device by the method in the past.

For instance, if the laminated semiconductor structure 12A has 10-µm diameter and is made in an 11-µm cycle, the metal film and semiconductor film to be wasted is 30 percent or so. The efficiency is dramatically improved as opposed to the cases in the past where, as the switching element is made in the manufacturing process of the liquid crystal display, nearly 90 percent of the metal film and semiconductor film is wasted in order to increase the open area ratio.

A second manufacturing method of the bidirectional two-terminal element 12 will be described.

The method uses the substrate 1 having a single-crystal silicon membrane 21a of approximately 1-µm thickness affixed to a base material 1a via a silicon oxide film 1b. In this case, the single-crystal silicon membrane 21a is an n-type semiconductor of which density of impurities are adequately selected so as to render the turn-on voltage of the bidirectional two-terminal elements 12 suited to driving. For instance, it is possible to make the turn-on voltage of the bidirectional two-terminal elements 12 7.5V or so by making the density of impurities $1.5 \times 10^{17}$ cm$^{-3}$ or so.

By ion doping, the impurities capable of forming a p-type layer such as boron are introduced to the substrate 1 so as to form the p-type layer corresponding to the first p-type region 22a. In this case, the acceleration voltage of ion implantation is adjusted so as to form the p-type layer corresponding to the first p-type region 22a at a desired depth and with a desired film thickness. In addition, the density of impurities of the p-type layer is in ohmic contact between the first p-type region 22a and second metal electrode 27.

Next, the impurities capable of forming the p-type layer such as the boron are introduced by an ion doping method so as to form the second p-type region 22. In this case, the acceleration voltage of ion implantation is adjusted so as to form the second p-type area 22 of a desired film thickness at a desired depth.

Next, the impurities capable of forming the p-type layer such as the boron are introduced by the ion doping method so as to form the third p-type region 24a. In this case, the acceleration voltage of ion implantation is adjusted so as to form the third p-type area 24a of a desired film thickness at a desired depth.

Next, the impurities capable of forming the p-type layer such as the boron are introduced by the ion doping method so as to form the p-type layer corresponding to the fourth p-type region 24b. In this case, the acceleration voltage of ion implantation is adjusted so as to form the p-type layer corresponding to the fourth p-type region 24b at a desired depth with a desired film thickness. In addition, the density of impurities of the p-type layer is in ohmic contact between the fourth p-type region 24b and first metal electrode 26.

Next, on the surface of the substrate, a mask is formed with the oxide film and so on at a position corresponding to the first p-type region 22a, and the impurities capable of forming the n-type region such as phosphorus are introduced so as to have the depth and film thickness corresponding to the p-type layer corresponding to the first p-type region 22a by adjusting the acceleration voltage by using the ion doping method. The first p-type region 22a and the first n-type region 21a are thereby formed.

Thereafter, the oxide film is eliminated, and on the surface of the substrate, the mask is formed with the oxide film and so on at the position corresponding to the fourth p-type region 24b. Thereafter, the impurities capable of forming the n-type layer such as phosphorus are introduced so as to have the depth and film thickness corresponding to the p-type layer corresponding to the fourth p-type region 24b by adjusting the acceleration voltage by using the ion doping method. The fourth p-type region 24b and the third n-type region 25 are thereby formed.

Next, the oxide film is eliminated. Thereafter, annealing is performed at an adequate temperature in order to activate the above introduced impurities.

In the above, the following method may be used from the process of forming the p-type layer corresponding to the fourth p-type region 24b onward.

On the surface of the substrate, the impurities capable of forming the n-type layer such as phosphorus are introduced by the ion doping method so as to form the n-type layer corresponding to the third n-type region 25. In this case, the acceleration voltage of the ion implantation is adjusted so as to form the n-type layer corresponding to the third n-type region 25 of a desired film thickness at a desired depth.

Next, the mask is formed with the oxide film and so on at a position corresponding to the first p-type region 22a, and the impurities capable of forming the n-type layer such as phosphorus are introduced so as to have the desired depth and film thickness by adjusting the acceleration voltage by using the ion doping method. The first p-type region 22a and the first n-type region 21a are thereby formed.

Subsequently, the impurities capable of forming the p-type region such as the boron is introduced so as to have the depth and film thickness corresponding to the n-type layer corresponding to the third n-type region 25 by adjusting the acceleration voltage by using the ion doping method. The third n-type region 25 and the fourth p-type region 24b are thereby formed. In this case, the density of impurities of the fourth p-type region 24b is in ohmic contact with the first metal electrode 26.

Next, the oxide film is eliminated. Thereafter, annealing is performed at an adequate temperature in order to activate the introduced impurities described above.

Thereafter, the first metal electrode 26 is film-formed by the sputtering method and so on. In this case, Ti, W and so on are selected, for instance, so that the first metal electrode 26 is in ohmic contact with the fourth p-type region 24b and the third n-type region 25. It may also be the laminated structure such as Al/Ti or ITO/Ti.

Thereafter, the patterning is performed by the photolithographic process and so on, and the etching is performed by the dry etching and so on until reaching the silicon oxide film. While the preferable patterning shape is the round shape in this case, it may also be another shape.

Hereafter, as described above, the laminated semiconductor structure 12A is transferred to the other substrate 1', and the second metal electrode 27 and light shielding layer 28 are formed so as to obtain the bidirectional two-terminal element 12 or 12'.

The bidirectional two-terminal elements 12 and 12' are formed so that the density of impurities thereof becomes $N_{A22a} \geq N_{A24b} > N_{D25} \geq N_{D21a} \geq N_{A22} \leq N_{A24a} > N_{D23}$. In this case, $N_{A22a}$, $N_{A24b}$, $ND_{25}$, $N_{D21a}$, $N_{A22}$, $N_{A24a}$ and $N_{D23}$ are the densities of impurities of the regions 22a, 24b, 25, 21a, 22, 24a and 23 respectively. The bidirectional two-terminal element 12 is formed so that the film thicknesses of the layers thereof become $d_{21a}$=200 nm, $d_{22a}$=200 nm, $d_{22}$=200 nm, $d_{24b}$=200 nm, $d_{24a}$=200 nm, $d_{25}$=200 nm, $d_{26}$=400 nm and $d_{27}$=400 nm, and $d_{23}$ becomes 260 nm or more. In this case, $d_{21a}$, $d_{22a}$, $d_{22}$, $d_{23}$, $d_{24b}$, $d_{24a}$ and $d_{25}$ are the film thicknesses of the respective regions 21a, 22a, 22, 23, 24b, 24a and 25, and $d_{26}$ and $d_{27}$ are the film thicknesses of the first metal electrode 26 and the second metal electrode 27. The light shielding layer 28 is formed to have a thickness of 300 nm or so. The light shielding layer 28 may be either perpendicular or inclined. The light shielding layer 28 may be either perpendicular or inclined. However, the light shielding layer 28 is not formed on the bidirectional two-terminal elements 12 and 12' used for the light-scanning display device such as the display device 100H.

It is desirable that the bidirectional two-terminal elements 12 and 12' suitably used for the electrophoresis display device 100C and toner display device 100D have the turn-on voltage of 50V or so. The layers are formed so that the densities of impurities thereof become $N^{A22a} \geq N_{A24b} > N_{D25} \geq N_{D21a} \geq N_{A22} \leq N_{A24a} > N_{D23} \leq 1.16 \times 10^{16}$ cm$^{-3}$ for instance. The layers are formed so that the film thicknesses thereof become $d_{21a}$=1.6 μm, $d_{22a}$=1.6 μm, $d_{22}$=1.6 μm, $d_{23}$=2.4 μm or more, $d_{24b}$=1.6 μm, $d_{24a}$=1.6 μm, $d_{25}$=1.6 μm, $d_{26}$=380 nm and $d_{27}$=380 nm or so.

It is desirable that the bidirectional two-terminal elements 12 and 12' suitably used for the twist-ball-method display device 100E have the turn-on voltage of 250V or so. The layers are formed so that the densities of impurities thereof become $N^{A22a} \geq N_{A24b} > N_{D25} \geq N_{D21a} \geq N_{A22} \leq N_{A24a} > N_{D23} \leq 1.36 \times 10^{15}$ cm$^{-3}$. The layers are formed so that the film thicknesses thereof become $d_{21a}$=10 μm, $d_{22a}$=10 μm, $d_{22}$=10 μm, $d_{23}$=15.5 μm or more, $d_{24b}$=10 μm, $d_{24a}$=10 μm, $d_{25}$=10 μm, $d_{26}$=380 nm and $d_{27}$=380 nm or so. The light shielding layer 28 is formed to have a thickness of 300 nm or so. The light shielding layer 28 may be either perpendicular or inclined. The light shielding layer 28 may be either perpendicular or inclined. However, the light shielding layer 28 is not formed on the bidirectional two-terminal elements 12 and 12' used for the light-scanning display device such as the display device 100H.

Thus, it is possible to make the bidirectional two-terminal elements 12 and 12' of various turn-on voltages by adjusting the semiconductor layer materials, densities of impurities and thicknesses.

[Driving Methods of the Display Devices]

Driving methods of the display devices 100A, 100B, 100F to 100H, and 101 having the bidirectional two-terminal element 12 made as mentioned above will be described.

First, the liquid crystal display 100A is driven as follows, for instance. A description will be given by referring to FIG. 14 as to the case of, for instance, applying an arbitrary gradation voltage to in the liquid crystal layer 20 at the maximum voltage of 5V when the turn-on voltage of the bidirectional two-terminal element 12 is 15V.

The turn-on voltage of 15V of the bidirectional two-terminal element 12 is applied to the n-th first electrode 11 of total k pieces of the first electrode 11 for a very short time. The time for applying the voltage for putting the bidirectional two-terminal element 12 in the on state (scanning voltage) is 1 to 2 μsec for instance. The bidirectional two-terminal element 12 on the n-th first electrode 11 is thereby turned on, and the picture electrodes 14 corresponding to the n-th first electrode 11 are electrically connected to the n-th first electrode 11. Moreover, the voltage applied to the n-th first electrode 11 is 0V after applying the voltage of 15V thereto for a very short time.

Figure 14:
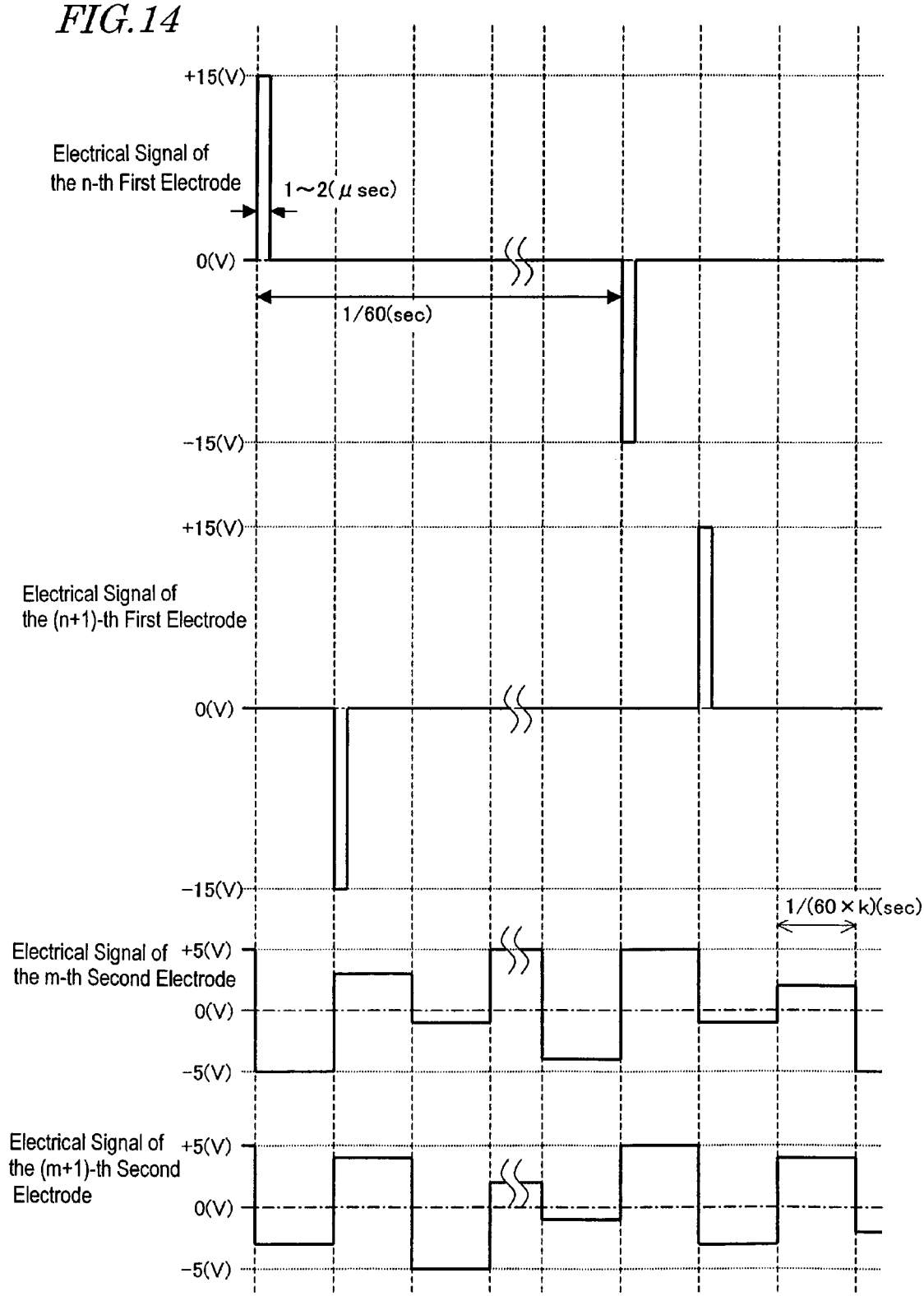
FIG. 14 is a diagram showing the waveform and timing of the electrical signal for explaining a driving method of the liquid crystal display 10A.
Figure 15:
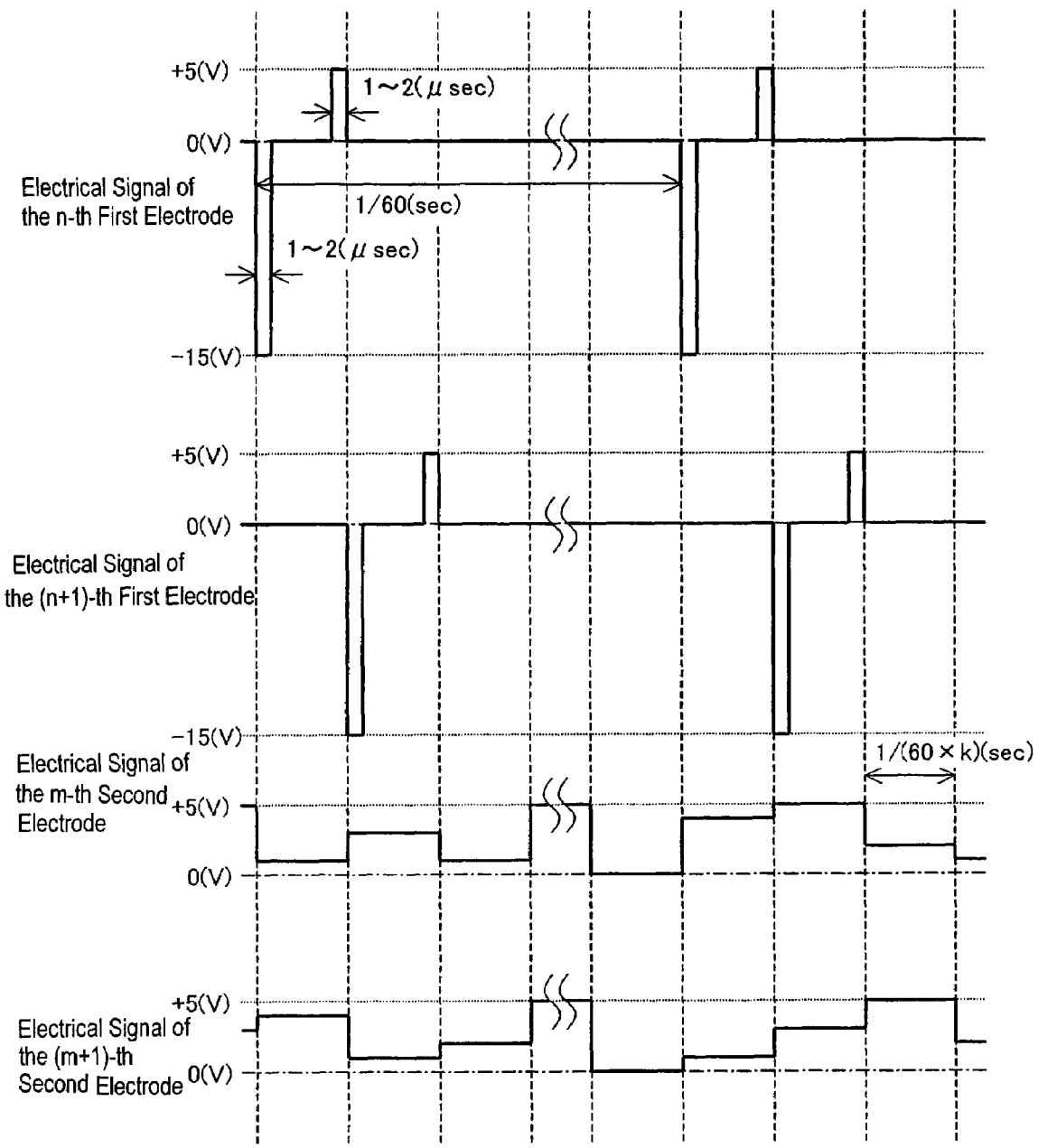
FIG. 15 is a diagram showing the waveform and timing of the electrical signal for explaining the driving method of the organic EL display device 100B.

During the period when the scanning voltage is applied to the n-th first electrode 11 (that is, the period when the n-th first electrode 11 is selected), a desired voltage (signal voltage) is applied to each of the plurality of second electrodes 17 crossing the first electrodes 11. FIG. 14 shows the electrical signal (signal voltage) applied to the m-th and m+1-th second electrodes 17. The polarity of the signal voltage is a reverse polarity to the voltage applied to the n-th first electrode 11 (scanning voltage), and the time for application is 1/(60×k) sec.

During the period when the n-th first electrode 11 is selected, the liquid crystal layer 20 between each of the picture electrodes 14 connected the n-th first electrode 11 and the second electrodes 17 opposed to each of the picture electrodes 14 is charged with the desired voltage applied to the second electrodes 17. If the liquid crystal layer 20 is sufficiently charged, the current running in the bidirectional two-terminal element 12 connected to each of the picture electrodes 14 is reduced so that the bidirectional two-terminal element 12 is put in an off state when lower than a certain current value. Thus, the voltage charged to the liquid crystal layer 20 between each of the picture electrodes 14 on the n-th first electrode 11 and the second electrodes 17 corresponding to each of them is maintained. As the bidirectional two-terminal element 12 is in the off state, the voltage applied to the liquid crystal layer 20 a picture electrode 14 corresponding to the n-th first electrode and the opposing second electrode 17 does not change even if the voltage applied to the second electrodes 17 changes.

Subsequently, the same operation as the above is performed as to the (n+1)-th first electrode 11 1/(60×k) sec. after applying the voltage to the n-th first electrode 11 so that the liquid crystal layer between the picture electrodes 14 on the (n+1)-th first electrode 11 and the second electrodes 17 opposed to each of them is charged with the desired voltage.

This is repeated k times so as to display one screen (one frame or field). Here, the time required to constitute one screen (one frame) is set as 1/60 (sec.) as a typical example.

As shown in FIG. 14, it is desirable to reverse the polarities of the scanning voltage applied to the n-th first electrode 11 and (n+1)-th first electrode 11 so as to obtain a high-quality image. Furthermore, if the voltage of the same polarity continues to be applied to the liquid crystal layer 20, it causes "burning" of the display. Therefore, it is desirable that the voltage to be applied for the sake of displaying a next screen (frame) have the reverse polarity as to each of the first electrode 11 and second electrodes 17 (frame reverse drive or field reverse drive).

The organic EL display device 100B shown in FIG. 5 is driven as follows, for instance. A description will be given by referring to FIG. 15 as to the driving method when the turn-on voltage of the bidirectional two-terminal element 12 is −15V and the voltage applied to the organic EL layer (light emitting layer) 35 is arbitrary between 0 to +5V, by taking as an example the case where an electron hole injection layer of the copper phthalocyanine or the like is connected on the second electrode 36 side and the light emitting material such as Alq3 is connected on the picture electrode 14 side.

The turn-on voltage of 15V of the bidirectional two-terminal element 12 is applied to the n-th first electrode 11 of total k pieces of the first electrode 11 for a very short time. The time for applying the voltage for putting the bidirectional two-terminal element 12 in the on state (scanning voltage) is 1 to 2 μsec for instance. There is no problem of visibility if the time for application is to this extent. The bidirectional two-terminal element 12 on the n-th first electrode 11 is thereby turned on, and the picture electrodes 14 corresponding to the n-th first electrode 11 are electrically connected to the n-th first electrode 11. Moreover, the voltage applied to the n-th first electrode 11 is 0V after applying the voltage of 15V thereto for a very short time.

During the period when the scanning voltage is applied to the n-th first electrode 11, a desired voltage (signal voltage) is applied to each of the plurality of second electrodes 17 crossing the first electrodes 11.

During the period when the n-th first electrode 11 is selected, the current according to the desired voltage applied to the second electrodes 36 runs in the light emitting layer 35 between each of the picture electrodes 14 connected the n-th first electrode 11 and the second electrodes 36 opposed to each of the picture electrodes 14 so as to emit the light.

Next, to stop the light emission after desired time, the voltage of +5V or so is applied to the n-th first electrode 11 for 1 to 2 μsec or so, so that the current running in the bidirectional two-terminal element 12 connected to the picture electrodes 14 on the n-th first electrode 11 is reversed or reduced, and the bidirectional two-terminal element 12 is thereby put in the off state so as to stop the light emission. The time from applying the voltage of −15V to the n-th first electrode 11 to finishing applying the voltage of +5V thereto is 1/(60×k) sec. for instance.

Subsequently, the same operation as the above is performed as to the (n+1)-th first electrode 11 1/(60×k) sec. after applying the voltage to the n-th first electrode 11 so that the organic EL layer 35 between the picture electrodes 14 on the (n+1)-th first electrode 11 and the second electrodes 36 opposed to each of them emits the light. This is sequentially repeated k times so as to display one screen (one frame or field) In the case where the light emitting material such as Alq3 is connected to the second electrode 36 and the electron hole injection layer of the copper phthalocyanine or the like is connected to the picture electrodes 14, all the polarities of the above applied voltage are the opposite polarities.

In the case of the display device 100G using the porous silicon shown in FIG. 10, a negative voltage is applied to the first electrode 11 side, and a positive voltage is applied to the second electrode 36 side so that, by the same driving method as the above, the light is emitted from the porous silicon layer 45 and thereby performs the display.

Figure 16:
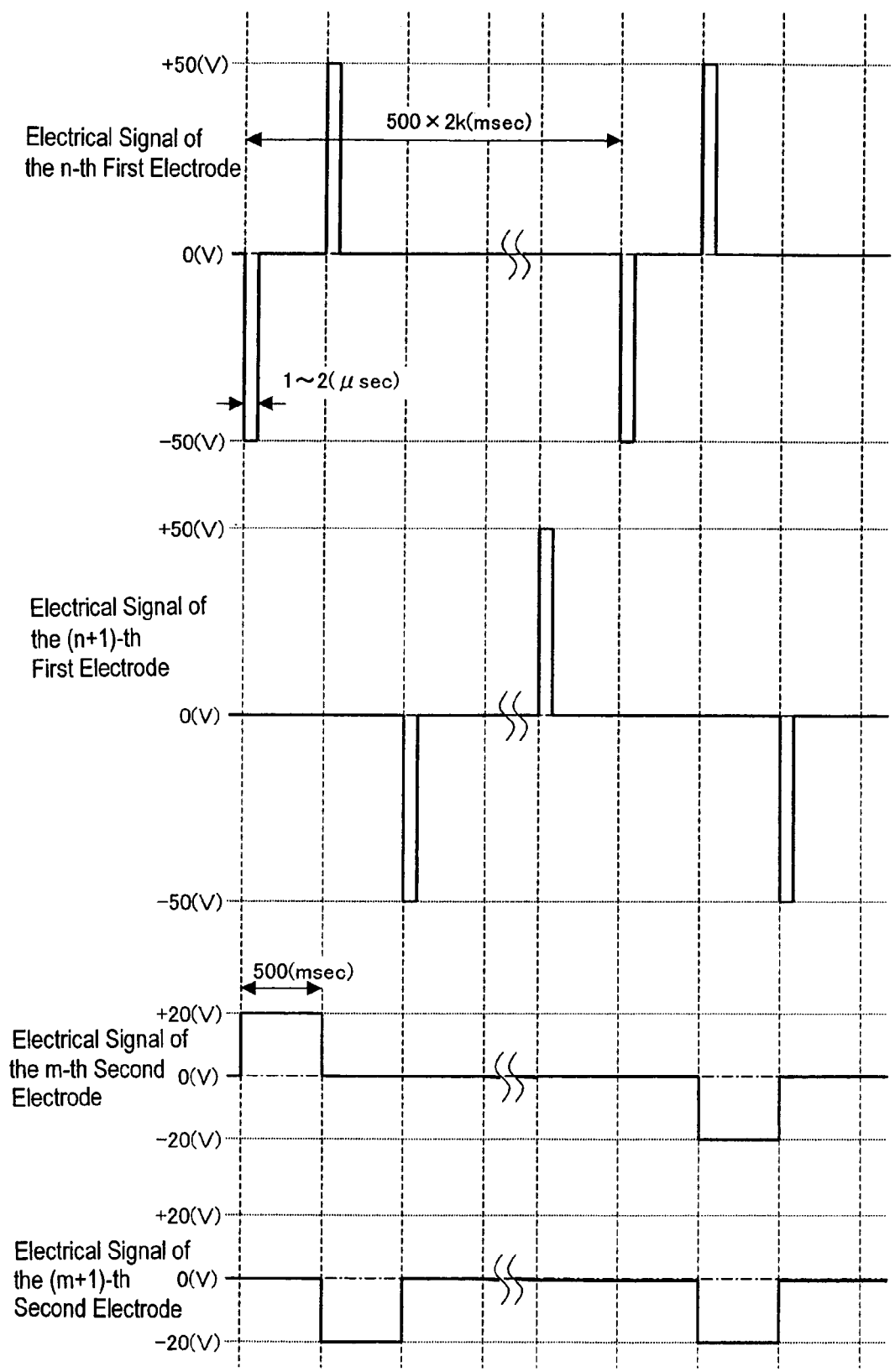
FIG. 16 is a diagram showing the waveform and timing of the electrical signal for explaining the driving method of the microcapsule-type electrophoresis display device 100C.

Next, the driving method of the microcapsule-type electrophoresis display device 100C shown in FIG. 6 will be described by referring to FIG. 16. Here, the turn-on voltage of the bidirectional two-terminal elements 12 is 50V, and the voltage applied to the display medium layer 20 (microcapsule 38) is 20V.

The turn-on voltage of −50V of the bidirectional two-terminal element 12 is applied to the n-th first electrode 11 of the total k pieces of the first electrode 11 for a very short time. The time for applying the voltage for putting the bidirectional two-terminal element 12 in the on state (scanning voltage) is 1 to 2 μsec for instance. The bidirectional two-terminal element 12 on the n-th first electrode 11 is thereby turned on, and the picture electrodes 14 corresponding to the n-th first electrode 11 are electrically connected to the n-th first electrode 11. Moreover, the voltage applied to the n-th first electrode 11 is 0V after applying the voltage of 15V thereto for a very short time.

During the period when the scanning voltage is applied to the n-th first electrode 11 (that is, the period when the n-th first electrode 11 is selected), 20V is applied to the second electrodes 17 including the pixels for performing white display of the plurality of second electrodes 17 crossing the first electrode 11. The time for applying the signal voltage is 500 msec for instance.

During the period when the n-th first electrode 11 is selected, the microcapsule 38 between the picture electrodes 14 connected to the n-th first electrode 11 and the second electrodes 17 having the voltage for the white display applied thereto is charged with the desired voltage applied to the second electrodes 17. If the microcapsule 38 is sufficiently charged, the current running in the bidirectional two-terminal element 12 connected to each of the picture electrodes 14 is reduced so that the bidirectional two-terminal element 12 is put in an off state when lower than a certain current value. Thus, the voltage charged to the microcapsule 38 between the picture electrodes 14 on the n-th first electrode 11 and the second electrodes 17 corresponding to each of them is maintained to perform the white display. As the bidirectional two-terminal element 12 is in the off state, the voltage applied to the microcapsule 38 between the picture electrodes 14 corresponding to the n-th first electrode 11 and the second electrodes 17 opposed thereto does not change even if the voltage of the second electrodes 17 changes.

As for the pixels for performing blue display of the n-th first electrode 11, the voltage of 50V is applied to the n-th first electrode 11 and the voltage of −20V is applied to the second electrodes 17 500 msec after applying the above voltage for the white display to the n-th first electrode 11. The time for applying the signal voltage is 500 msec as with the above-described process.

The same operation as described above is performed as to the (n+1)-th first electrode 11 500×2 msec. after applying the voltage to the n-th first electrode 11 so that the microcapsule 38 between the picture electrodes 14 on the (n+1)-th first electrode 11 and the second electrodes 17 opposed to each of them is charged with the desired voltage.

This is repeated k times so as to display one screen (one frame or field). The time required to constitute one screen (one frame) is set as (500×2 k) msec.

The toner display device 100D shown in FIG. 7 is driven by the same method as the above electrophoresis display device 100C. However, the time for applying the signal voltage to the second electrodes 17 may be 1 msec or so. The toner display device 100D performs black and white display.

The twist-ball-method display device 100E shown in FIG. 8 is also driven by the same method as the above electrophoresis display device 100C. However, the turn-on voltage of the bidirectional two-terminal elements 12 is 250V, the scanning voltage applied to the first electrode 11 is ±250V, the signal voltage applied to the second electrodes 17 is ±100V, and the time for applying the signal voltage is 100 msec.

The electrochromic display device 100F shown in FIG. 9 is also driven by the same method as the above electrophoresis display device 100C. However, the turn-on voltage of the bidirectional two-terminal elements 12 is 15V, the scanning voltage applied to the first electrode 11 is ±15V, the signal voltage applied to the second electrodes 17 is ±15V, and the time for applying the signal voltage is 500 msec.

In the case of the light-scanning liquid crystal display 100H shown in FIG. 11, unlike the above-mentioned liquid crystal display 100A (FIG. 4), no scanning voltage is applied to the first electrode 11, which is constantly in a state of 0V. Instead of applying the scanning voltage to the first electrode 11, the light is introduced to the optical fiber 49, and the introduced light is irradiated from the high refractive index portion 48a to the bidirectional two-terminal element 12 which is then turned on. It is driven just as the liquid crystal display 100A except that the first electrode 11 is selected by the light.

The display devices using the display medium layers other than the liquid crystal displays are the light-scanning display devices likewise, and are driven likewise.

According to the present invention, it is possible to provide the active matrix type display device which can be manufactured by an easier method than before and a manufacturing method thereof.

According to the present invention, it is possible to provide the simple manufacturing method of the bidirectional two-terminal element suitably used as a switching element of the display device.

According to the present invention, it is possible to improve usability of the materials and energy and simplify the manufacturing process of the display device so as to provide an active type display device at a lower price than before.

The invention claimed is:

1. A display device comprising:
   a plurality of first electrodes;
   a plurality of bidirectional two-terminal elements;
   a plurality of picture electrodes electrically connected to any one of said plurality of first electrodes via at least one of said plurality of bidirectional two-terminal elements, respectively;
   a plurality of second electrodes; and
   a display medium layer provided between said plurality of picture electrodes and said plurality of second electrodes; wherein
   a layout relationship between each of the plurality of picture electrodes and said at least one of said plurality of bidirectional two-terminal elements is random; and
   in which each of said plurality of bidirectional two-terminal elements further has a light-shielding layer covering a side of said laminated semiconductor structure.

2. The display device according to claim 1, further comprising a conductive resin layer provided between each of said plurality of first electrodes and said at least one bidirectional two-terminal element and including a conductive material and a photosensitive resin.

3. The display device according to claim 1, in which width of said plurality of bidirectional two-terminal elements is smaller than spacing between adjacent ones of said plurality of picture electrodes.

4. The display device according to claim 1, in which the width of said plurality of bidirectional two-terminal elements is smaller than the spacing between the adjacent ones of said plurality of first electrodes.

5. The display device according to claim 1, in which said plurality of bidirectional two-terminal elements are selectively placed on said plurality of first electrodes.

6. The display device according to claim 5, in which, of said plurality of picture electrodes, area of a portion overlapping the plurality of first electrodes is half or less than half of the area of the entirety of said plurality of picture electrodes.

7. A method of manufacturing a display device having a plurality of first electrodes, a plurality of bidirectional two-terminal elements, a plurality of picture electrodes electrically connected to any one of said plurality of first electrodes via at least one of the plurality of bidirectional two-terminal elements respectively, a plurality of second electrodes, and a display medium layer provided between said plurality of picture electrodes and said plurality of second electrodes, said method comprising the steps of:
   (a) preparing a substrate having a principal surface on which the plurality of first electrodes are formed;
   (b) preparing a plurality of bidirectional two-terminal elements, each of the plurality of bidirectional two-terminal elements having a pair of mutually opposed electrodes;
   (c) placing said plurality of bidirectional two-terminal elements randomly on the plurality of first electrodes at a predetermined density so that each of the plurality of bidirectional two-terminal elements is electrically connected to any one of said plurality of first electrodes via one of said pair of electrodes;
   (d) forming the plurality of picture electrodes electrically connected to any one of said plurality of first electrodes via at least one of said plurality of bidirectional two-terminal elements, respectively; and
   (e) providing said plurality of second electrodes and said display medium layer to be mutually opposed via the display medium layer between said plurality of picture electrodes and said plurality of second electrodes;
   wherein said step (c) comprises the steps of:
   (c-1) dispersing said plurality of bidirectional two-terminal elements in a predetermined density in a coating material including a conductive material and a resin material;
   (c-2) providing said coating material in which said plurality of bidirectional two-terminal elements are dispersed, on said plurality of first electrodes of said substrate such that said coating material surrounds said plurality of bidirectional two-terminal elements; and
   (c-3) selectively leaving said coating material existing between said plurality of first electrodes of said substrate and said plurality of bidirectional two-terminal elements.

8. The method of manufacturing a display device according to claim 7, in which the resin material includes a positive photosensitive resin, and the process of selectively leaving the coating material includes the process of performing exposure to light from the principal surface side of the substrate.

9. The method of manufacturing a display device according to claim 7, wherein said step (d) comprises the steps of: providing an insulating material to cover said plurality of bidirectional two-terminal elements placed on said plurality of first electrodes; selectively eliminating an insulating material on said plurality of bidirectional two-terminal elements and thereby exposing the other electrode of each of said plurality of bidirectional two-terminal elements; and forming the plurality of picture electrodes, each of them electrically connected to said other electrode which is exposed.

10. The method of manufacturing a display device according to claim 9, wherein said insulating material includes a negative-type photosensitive resin, and said step of exposing the other electrode includes a step of irradiating light from a backside of said substrate.

11. The method of manufacturing a display device according to claim 7, in which each of said plurality of bidirectional two-terminal elements has a laminated semiconductor structure between said pair of electrodes and a side of the laminated semiconductor structure is covered by a light-shielding layer.

12. The method of manufacturing a display device according to claim 7 in which the step (c-2) is performed by providing said coating material on said plurality of first electrodes by an inkjet method.

13. The method of manufacturing a display device according to claim 3, in which said plurality of first electrodes are formed on the principal surface of the substrate by the inkjet method in the step (a).

14. A method of manufacturing a display device having a plurality of first electrodes, a plurality of bidirectional two-terminal elements, a plurality of picture electrodes electrically connected to one of the plurality of first electrodes via at least one of the plurality of bidirectional two-terminal elements respectively, a plurality of second electrodes, and a display medium layer provided between the plurality of picture electrodes and the plurality of second electrodes, the method comprising the steps of:
  (a) preparing a substrate having a principal surface;
  (b) preparing the plurality of bidirectional two-terminal elements, each of them having a pair of mutually opposed electrodes respectively;
  (c) providing on the principal surface of the substrate a solution in which conductive particles for forming said first electrodes and the plurality of bidirectional two-terminal elements are dispersed in a solvent such that the solvent surrounds the plurality of bidirectional two-terminal elements, to form the plurality of first electrodes on the principal surface, and placing the plurality of bidirectional two-terminal elements randomly on the plurality of first electrodes so that each thereof will be electrically connected to one of the plurality of first electrodes via one of the pair of electrodes;
  (d) forming the plurality of picture electrodes electrically connected to any one of said plurality of first electrodes via at least one of said plurality of bidirectional two-terminal elements respectively; and
  (e) providing said plurality of second electrodes and said display medium layer to be mutually opposed via said display medium layer between said plurality of picture electrodes and said plurality of second electrodes.

15. The method of manufacturing a display device according to claim 14, in which the step (c) includes a step of providing the solution on said principal surface of said substrate by the inkjet method.

16. The method of a manufacturing display device according to claim 15, in which said solution further includes a binder, and the step (c) further comprises a step of baking the binder included in said provided solution.

17. The method of manufacturing a display device according to claim 7, wherein said conductive material is ITO.

18. The method of manufacturing a display device according to claim 14, wherein said conductive particles are ITO particles.

* * * * *